(12) United States Patent
Lin et al.

(10) Patent No.: US 9,250,749 B2
(45) Date of Patent: Feb. 2, 2016

(54) ELECTRICAL APPARATUS

(71) Applicant: Cho-Yi Lin, New Taipei (TW)

(72) Inventors: Hung-Yu Lin, Taipei (TW); Cho-Yi Lin, Taipei (TW); Tsung-Peng Lin, Taipei (TW); Xiang-Chi Lee, Taipei (TW)

(73) Assignee: Cho-Yi Lin, New Taipei (TW)

( * ) Notice: Subject to any disclaimer, the term of this patent is extended or adjusted under 35 U.S.C. 154(b) by 7 days.

(21) Appl. No.: 14/293,015

(22) Filed: Jun. 2, 2014

(65) Prior Publication Data

US 2014/0267174 A1    Sep. 18, 2014

Related U.S. Application Data

(63) Continuation-in-part of application No. 13/110,844, filed on May 18, 2011, now Pat. No. 8,773,375.

(30) Foreign Application Priority Data

Jun. 1, 2010   (TW) ............................... 99117670 A

(51) Int. Cl.
G06F 3/041    (2006.01)
G06F 3/042    (2006.01)

(52) U.S. Cl.
CPC .................................... G06F 3/0428 (2013.01)

(58) Field of Classification Search
None
See application file for complete search history.

(56) References Cited

U.S. PATENT DOCUMENTS

| 7,443,387 | B2 | 10/2008 | Tanaka et al. |
| 2008/0152348 | A1 | 6/2008 | Chen |
| 2009/0309844 | A1 | 12/2009 | Woo et al. |
| 2010/0207909 | A1 | 8/2010 | Wu et al. |
| 2011/0291991 | A1 | 12/2011 | Lin |
| 2015/0153905 | A1* | 6/2015 | Wang .................... G06F 3/0428 345/175 |

FOREIGN PATENT DOCUMENTS

| CN | 1811683 A | 8/2006 |
| CN | 201000620 Y | 1/2008 |
| CN | 201191355 Y | 2/2009 |
| CN | 201378310 Y | 1/2010 |
| TW | M357653 | 5/2009 |

(Continued)

OTHER PUBLICATIONS

First Office Action in Chinese application No. 100098; Jan. 30, 2013; State Intellectual Property Office of the People's Republic of China.

(Continued)

*Primary Examiner* — Joseph Haley

(74) *Attorney, Agent, or Firm* — Stevens & Showalter LLP

(57) ABSTRACT

There is provided a portable optical touch system including a first image sensing module, a second image sensing module, a connecting device, a communication interface and a processing circuit. The two image sensing modules have partially overlapped field of views and the partially overlapped field of views is for defining a touch region. The connecting device is configured to adjust or fix a distance between the first and second image sensing modules. When an object is in the touch region, the processing circuit calculates a position of the object according to images of the object acquired by the two image sensing modules and outputs information of the position of the object through the communication interface.

30 Claims, 24 Drawing Sheets

(56) References Cited

FOREIGN PATENT DOCUMENTS

| | | |
|---|---|---|
| TW | 200925961 A1 | 6/2009 |
| TW | 201011616 A1 | 3/2010 |

OTHER PUBLICATIONS

Second Office Action in Chinese application No. 100098; Sep. 12, 2013; State Intellectual Property Office of the People's Republic of China.

Taiwanese First Office Action and Search Report in application No. 099117670; Aug. 7, 2013; Taiwan Intellectual Property Office; Taipei, Taiwan.

Taiwanese Final Office Action and Search Report in application No. 099117670; Nov. 22, 2013; Taiwan Intellectual Property Office; Taipei, Taiwan.

Lin, Hung-Yu; U.S. Appl. No. 14/265,767 for Portable Optical Touch System; Apr. 30, 2014; U.S. Patent and Trademark Office; Alexandria, VA.

\* cited by examiner

US 9,250,749 B2

ELECTRICAL APPARATUS

CROSS REFERENCE TO RELATED APPLICATION

This application claims the priority benefit of Taiwan Patent Application Serial Number 099117670, filed on Jun. 1, 2010, the full disclosure of which is incorporated herein by reference.

This application is a continuation in part patent application of U.S. application Ser. No. 13/110,844 filed on May 18, 2011, the entire contents of which are hereby incorporated by reference for which priority is claimed under 35 U.S.C. §120.

BACKGROUND

1. Field of the Invention

This invention generally relates to the field of touch control technology and, more particularly, to a portable optical touch system, a portable optical touch device and a method for detecting a position of at least one object.

2. Description of the Related Art

FIG. 1 shows a solid diagram of a conventional optical touch system. Please refer to FIG. 1, an optical touch system 100 includes a panel 104, image sensing modules 106 and 108, a processing circuit 110, a reflecting element 112, a reflecting element 114 and a reflecting element 116. In addition, a quadrilateral area referred by a numerical reference 118 shown in FIG. 1 is served as a touch region of the optical touch system 100, and the image sensing modules 106 and 108 are respectively disposed at two different corners of the touch region 118 such that field of views of the two image sensing modules 106 and 108 can respectively cover the touch region 118. In this embodiment, a shape of the touch region 118 is a quadrilateral, and preferably a rectangle. A numerical reference 102 shown in FIG. 1 refers to an object.

In the components of the optical touch system 100, the reflecting element 112, reflecting element 114 and reflecting element 116 are made of retro-reflective material and configured to reflect incident light (e.g. IR light) to the touch region 118. The image sensing modules 106 and 108 are configured to acquire images looking across the touch region 118. The processing circuit 110 is configured to receive the images acquired by the image sensing modules 106 and 108, and calculate coordinates of the object 102 relative to the touch region 118 according to the images acquired by the image sensing modules 106 and 108.

FIG. 2 shows an operation diagram of the single point control of the optical touch system shown in FIG. 1. In FIG. 2, numerical references identical to those shown in FIG. 1 refer to the same components. As shown in FIG. 2, the image sensing module 106 detects the object 102 following a route 202 while the image sensing module 108 detects the object 102 following a route 204. Accordingly, as long as the processing circuit 110 is able to obtain linear equations of the routes 202, 204 and further to calculate a cross point thereof, a coordinate of the object 102 can then be obtained.

The method of how the two linear equations of the routes 202 and 204 are obtained by the optical touch system 100 will be illustrated hereinafter. But the structure of the image sensing modules 106 and 108 will be illustrated first.

Taking the optical sensing module 106 as an example, its structure is shown in FIG. 3. FIG. 3 shows a block diagram of the image sensing module 106. Please refer to FIG. 3, the image sensing module 106 includes an IR emitter 302, an optical lens set 304, an IR filter 306 allowing only IR light to pass through, and an image sensor 308; wherein the IR emitter 302 is configured to emit IR light to illuminate the touch region 118, reflecting element 112, reflecting element 114 and reflecting element 116; and the image sensor 308 acquires images inside and looking across the touch region 118 sequentially through the IR filter 306 and the optical lens set 304, and transmits the acquired images to the processing circuit 110. When the object 102 is inside the touch region 118, the image sensing module 106 is able to acquire images containing the image of the object 102 as shown in FIG. 4.

FIG. 4 shows a schematic diagram of an image acquired by the image sensing module 106. In FIG. 4, a white region referred by a numerical reference 402 is a bright zone which has a higher brightness in the acquired image and is formed by sensing the IR light emitted from the IR emitter 302 and the IR light reflected by the reflecting elements 114 and 116, and the bright zone 402 is served as a main sense region of the system. A numerical reference 404 refers to a dark zone formed by the object 102 from blocking the bright zone 402.

From FIGS. 2 and 4, it is known that as long as the processing circuit 110 is able to obtain an angle $\alpha$ (i.e. an included angle between the route 202 and an upper side of the touch region 118) and a gravity center (or a center) of the dark zone 404, the linear equation of the route 202 can then be calculated. Similarly, the processing circuit 110 is able to calculate the linear equation of the route 204 by using similar method. A coordinate of the object 102 is the cross point of the routes 202 and 204.

The optical touch system shown in FIG. 1 can perform the functions of a user input interface, e.g. a mouse, a keyboard or a touchpad for a computer system such that a user may perform input operation directly with his or her finger. However, since the optical touch system 100 has to adopt the physical panel 104, reflecting element 112, reflecting element 114 and reflecting element 116 for operation, the operational environment is significantly limited. Furthermore, the physical panel 104, reflecting element 112, reflecting element 114 and reflecting element 116 are not cheap such that this kind of optical touch system has a high price. In addition, as the panel 104 has a considerable volume and the reflecting element 112, reflecting element 114 and reflecting element 116 have considerable lengths, the size of the optical touch system 100 can not be further reduced to be carried easily.

Accordingly, problems need to be solved in a modern optical touch system 100 include the using environment, cost, size and portability.

SUMMARY

It is an object of the present invention to provide a portable optical touch system.

It is another object of the present invention to provide a portable optical touch device.

It is a further object of the present invention to provide a method for detecting a position of at least one object that may be adapted to the portable optical touch system and device mentioned above.

It is a further object of the present invention to provide a electronic apparatus.

The present invention provides a portable optical touch system including a first image sensing module, a second image sensing module, a length-adjustable connecting device, a communication interface and a processing circuit. A field of view of the first image sensing module and a field of view of the second image sensing module are partially overlapped and the partially overlapped field of views is for defining a touch region. The length-adjustable connecting device is configured to adjust a distance between the first image sensing module and the second image sensing module. The processing circuit is for calculating a position of an object in the touch region according to images of the object acquired by the first image sensing module and the second image sensing module, and for outputting information of the position through the communication interface.

The present invention further provides a portable optical touch system including a first image sensing module, a second image sensing module, a connecting device, a communication interface and a processing circuit. A field of view of the first image sensing module and a field of view of the second image sensing module are partially overlapped and the partially overlapped field of views is for defining a touch region. The connecting device connects the first image sensing module and the second image sensing module, wherein a distance between the first image sensing module and the second image sensing module is a predetermined length. The processing circuit is for calculating a position of an object in the touch region according to images of the object acquired by the first image sensing module and the second image sensing module, and for outputting information of the position through the communication interface.

The present invention further provides a portable optical touch device for detecting a position of at least one object, and the portable optical touch device includes a first image sensing module, a second image sensing module, at least one IR emitter, a processing circuit and a display screen. The first image sensing module further includes a first image sensor, a first IR filter and a first optical lens set. The second image sensing module further includes a second image sensor, a second IR filter and a second optical lens set. The at least one IR emitter is disposed in the vicinity of the first image sensing module and/or the second image sensing module. A field of view of the first image sensing module and a field of view of the second image sensing module are partially overlapped and the partially overlapped field of views is for defining a touch region. The at least one IR emitter is configured to emit IR light to illuminate the object in the touch region. The first image sensing module and the second image sensing module acquire images of the object respectively through the first IR filter and the second IR filter. The first optical lens set and the second optical lens set are respectively disposed in front of the first image sensor and the second image sensor for broadening a field of view of the associated image sensor to at least 90 degrees. The processing circuit is for calculating and outputting information of the position of the object according to the images of the object acquired by the first and second image sensing modules. The display screen is configured to display and correlate with the position of the object outputted by the processing circuit.

The present invention further provides a portable optical touch device for detecting a position of at least one object, and the portable optical touch device includes a first image sensing module, a second image sensing module, at least one laser emitting device, a third optical lens set, a processing circuit and a display screen. The first image sensing module further includes a first image sensor and a first optical lens set. The second image sensing module further includes a second image sensor and a second optical lens set. The at least one laser emitting device is disposed nearby the first image sensing module and/or the second image sensing module. The third optical lens set is disposed in front of the at least one laser emitting device. A field of view of the first image sensing module and a field of view of the second image sensing module are partially overlapped and the partially overlapped field of views is for defining a touch region. The at least one laser emitting device is configured to emit a point laser light to be converted to a linear laser light through the third optical lens set to illuminate the object in the touch region. The first image sensor and the second image sensor acquire images of the object respectively through the first optical lens set and the second optical lens set. The first optical lens set and the second optical lens set are respectively configured to broaden a field of view of the associated image sensor to at least 90 degrees. The processing circuit is for calculating and outputting information of the position of the object according to the images of the object acquired by the first and second image sensing modules. The display screen is configured to display and correlate with the position of the object outputted by the processing circuit.

The present invention further provides a method for detecting a position of at least one object that may be adapted to a portable optical touch system including a first image sensing module, a second image sensing module, a connecting device, a processing circuit and a communication interface, wherein a field of view of the first image sensing module and a field of view of the second image sensing module are partially overlapped and the partially overlapped field of views is for defining a touch region, and the connecting device is configured to adjust or fix a distance between the first and second image sensing modules. The method includes the steps of: acquiring images of the object in the touch region by using the first and second image sensing modules; calculating the position of the object by using the processing circuit according to the images of the object acquired by the first and second image sensing modules; and outputting information of the position of the object through the communication interface.

The present invention further provides an electronic apparatus including an electronic device and a portable optical touch system. The electronic device has a slot. The portable optical touch system is disposed in the slot, wherein the portable optical touch system includes a first image sensing module, a second image sensing module, a length-adjustable connecting device, a communication interface and a processing circuit. A field of view of the first image sensing module and a field of view of the second image sensing module are partially overlapped and the partially overlapped field of views is for defining a touch region. The length-adjustable connecting device connects the first image sensing module and the second image sensing module, wherein the length-adjustable connecting device adjusts a distance between the first image sensing module and the second image sensing module. The processing circuit is for calculating a position of an object in the touch region according to images of the object acquired by the first image sensing module and the second image sensing module, and for outputting information of the position through the communication interface.

The present invention mainly adopts two image sensing modules and a processing circuit to construct a portable optical touch system. In an actual design, the two image sensing modules have partially overlapped field of views and the partially overlapped field of views is for defining a touch region. In this manner, when there is an object inside the touch region, the processing circuit may calculate a position of the object according to images of the object acquired by the two image sensing modules. In a further design, the two image sensing modules may emit IR light or laser light to illuminate the object so as to acquire the images of the object reflecting the IR light or the laser light whereby the processing circuit is able to calculate the position of the object according to these acquired images. In a further design, the IR light or the laser light may be emitted by a component disposed outside the image sensing modules to illuminate the object in the touch region.

Additionally, The present invention further adopts the auxiliary device, so as to move the portable optical touch system out of the slot (i.e. out of the electronic device) in the using state, and move the portable optical touch system into the slot (i.e. into the electronic device) in the accommodating state. Therefore, a convenience for using and accommodating the portable optical touch system is increased.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

First Embodiment

Figure 1:
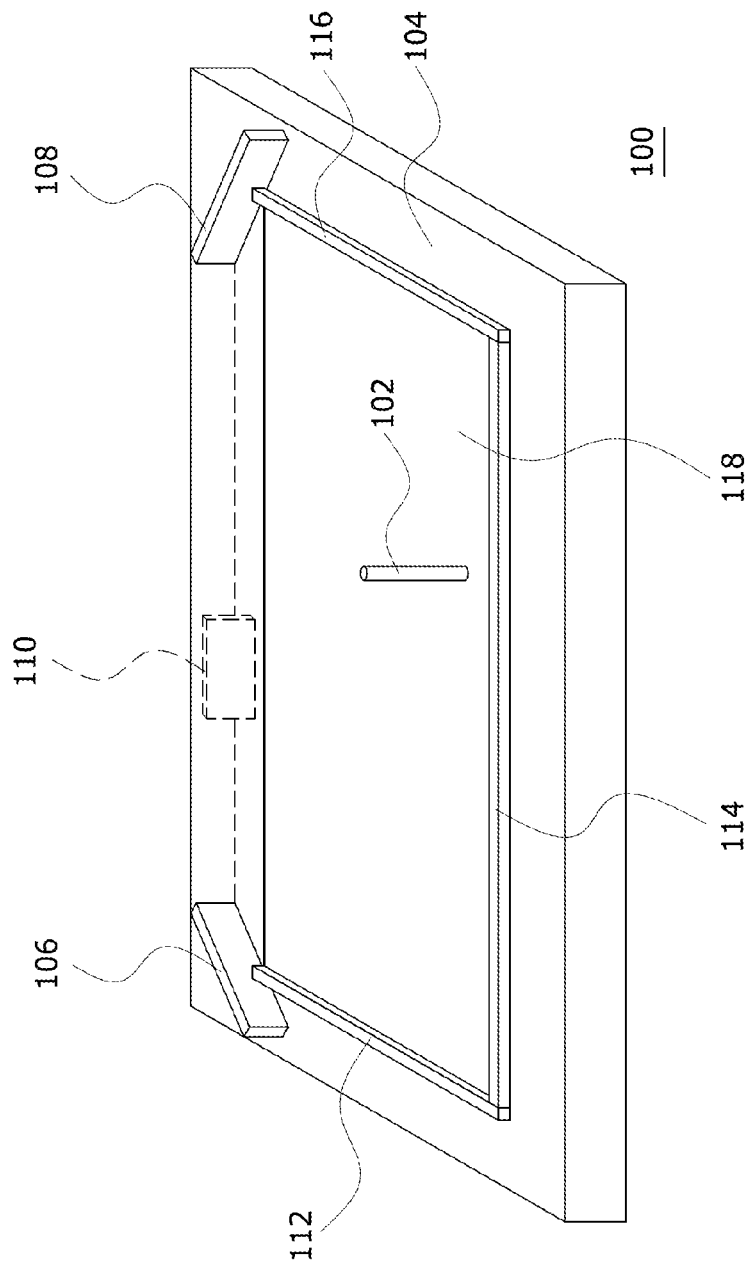
FIG. 1 shows a solid diagram of a conventional optical touch system.
Figure 2:
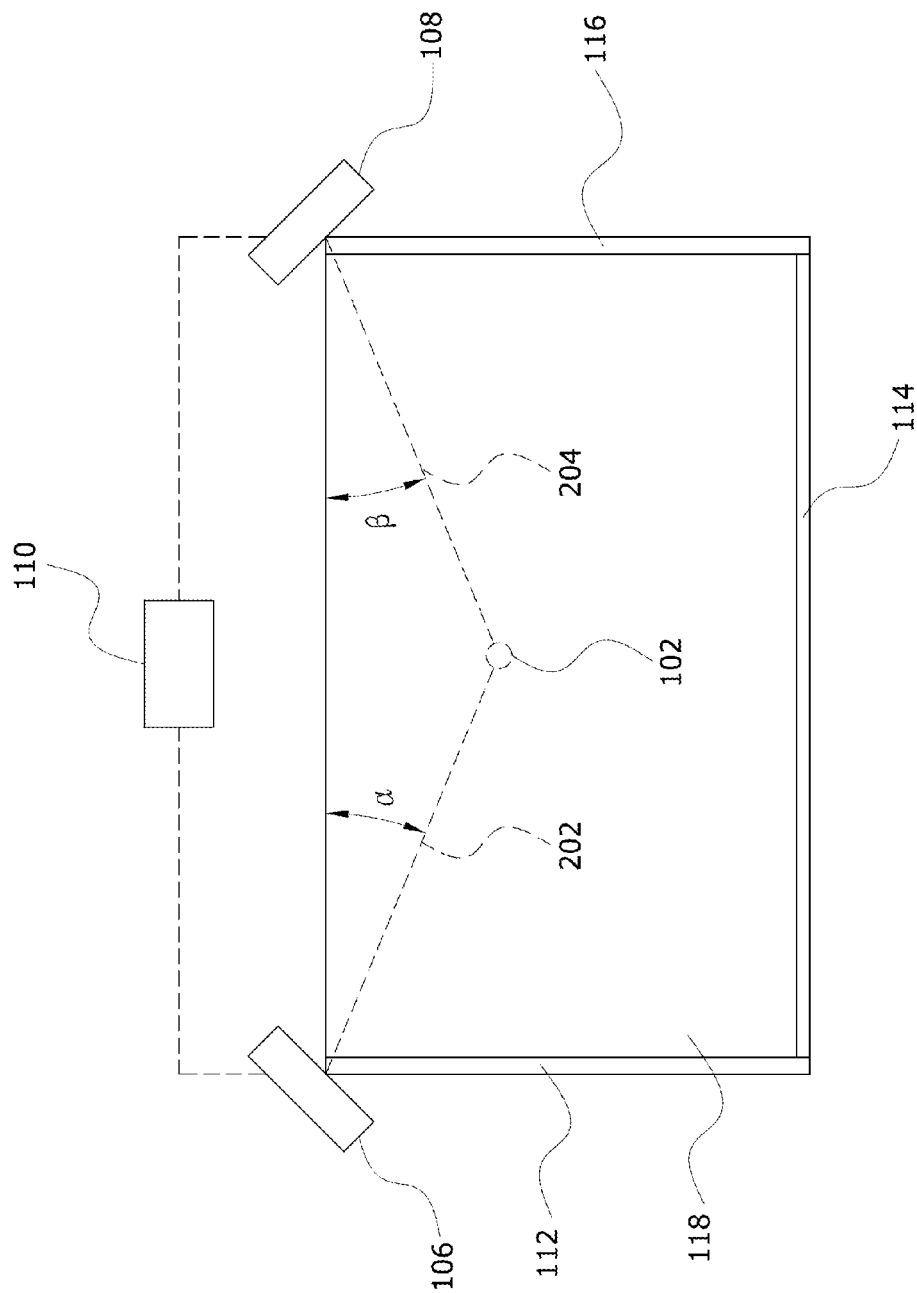
FIG. 2 shows an operation diagram of the single point control of the optical touch system shown in FIG. 1.
Figure 3:
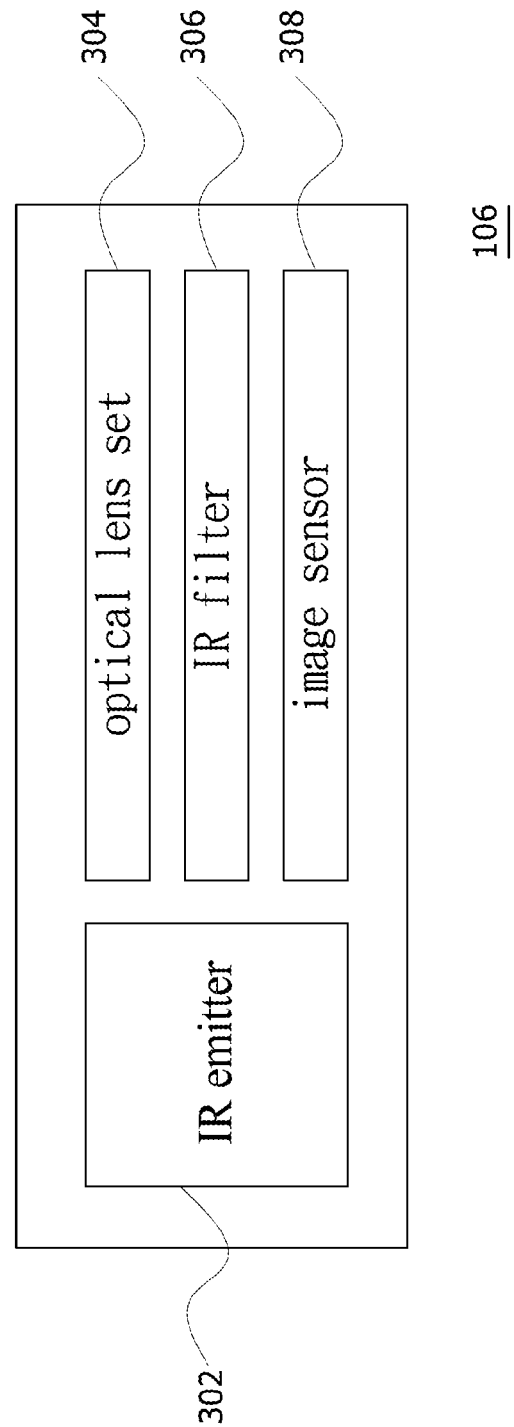
FIG. 3 shows a block diagram of the image sensing module.
Figure 4:
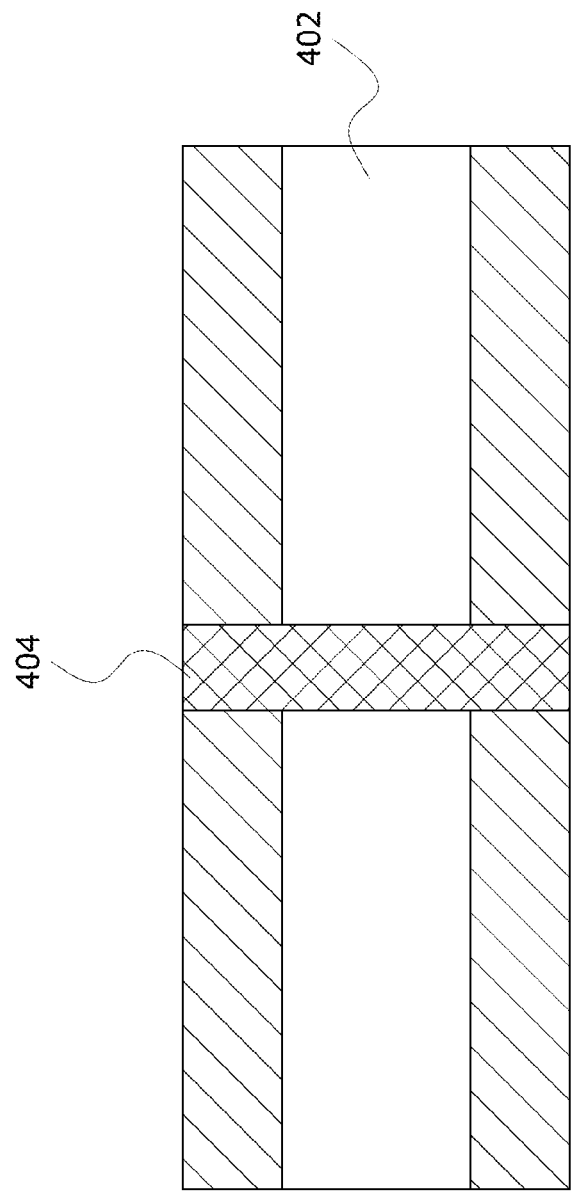
FIG. 4 shows a schematic diagram of an image acquired by the image sensing module.
Figure 5:
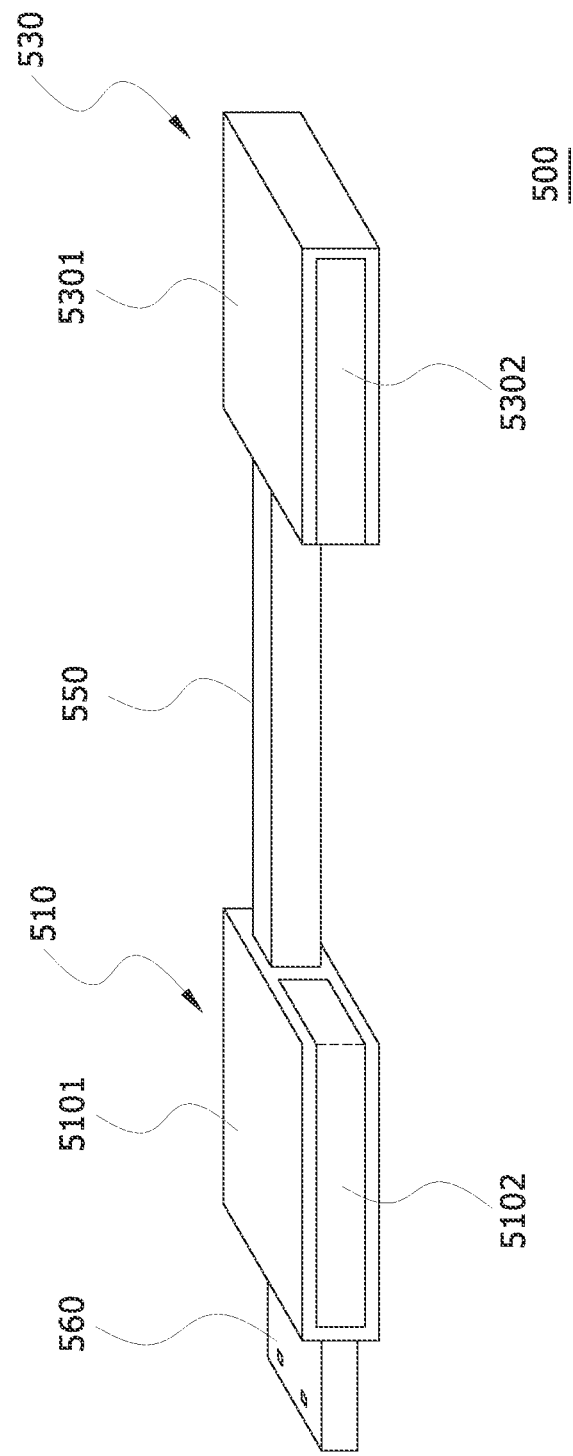
FIG. 5 shows a solid diagram of the portable optical touch system according to an embodiment of the present invention.
Figure 6:
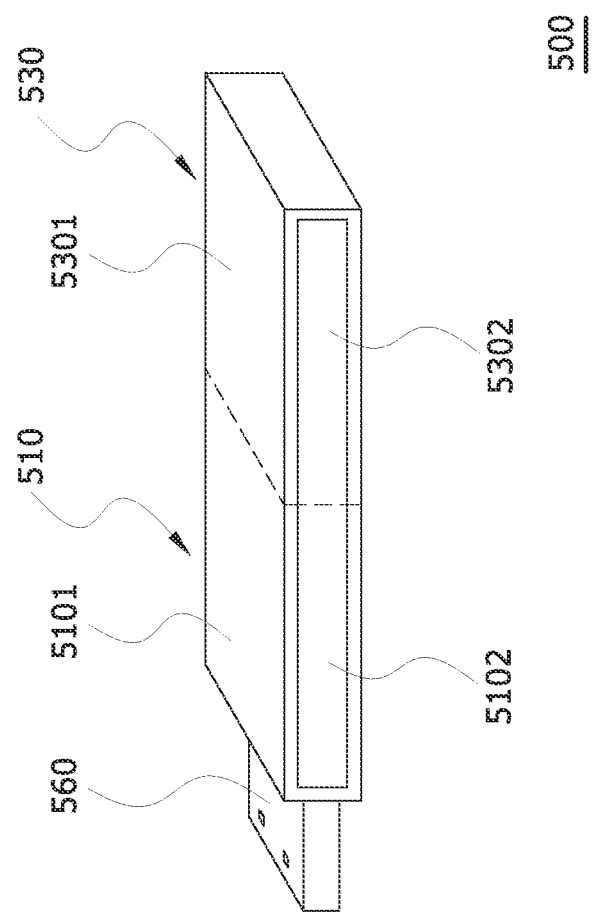
FIG. 6 shows another solid diagram of the portable optical touch system shown in FIG. 5.
Figure 7:
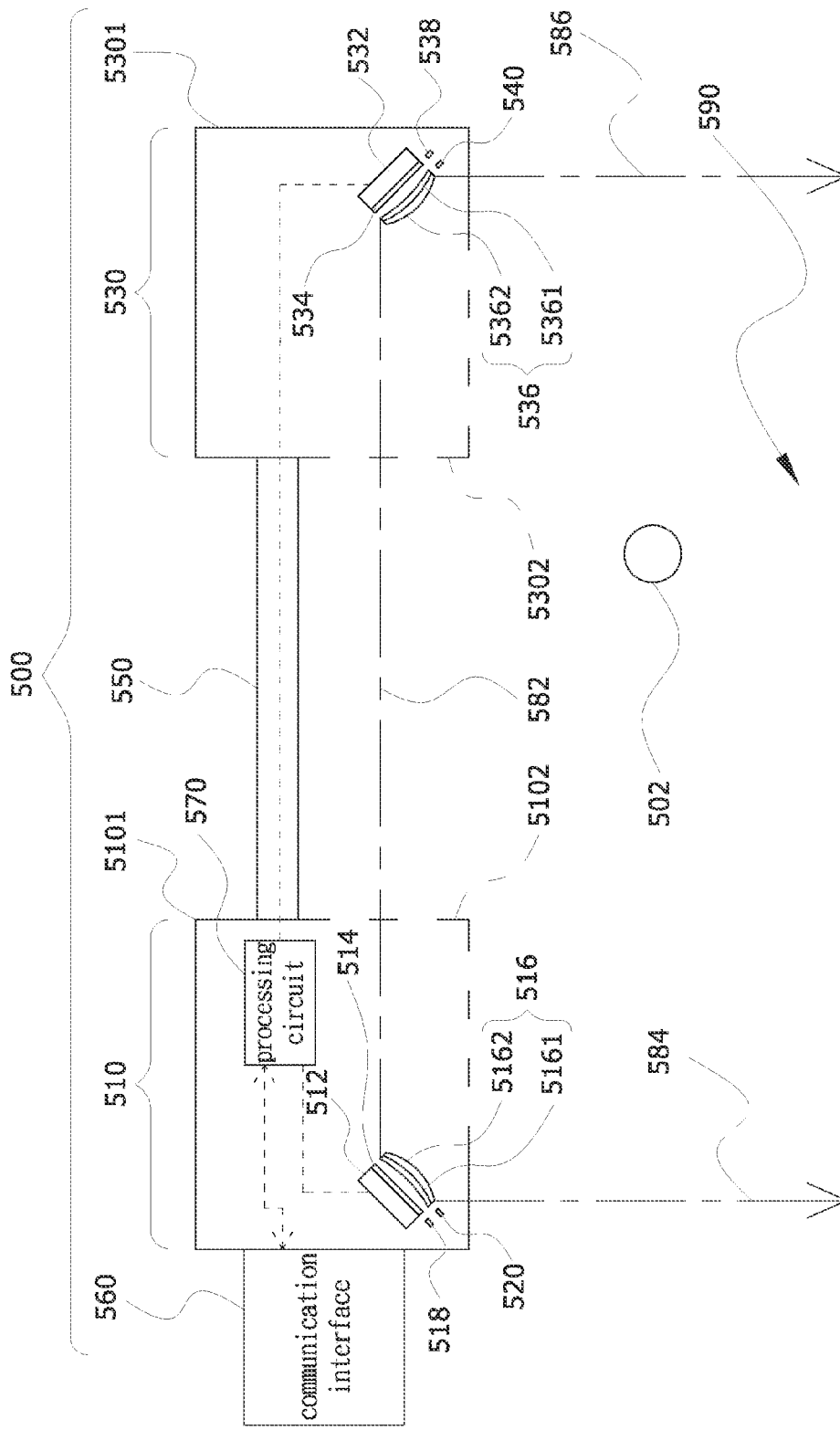
FIG. 7 shows a top perspective view of the portable optical touch system shown in FIG. 5.

FIG. 5 shows a solid diagram of the portable optical touch system according to an embodiment of the present invention; FIG. 6 shows another solid diagram of the portable optical touch system shown in FIG. 5; and FIG. 7 shows a top perspective view of the portable optical touch system shown in FIG. 5. Please first refer to FIGS. 5 and 7, the portable optical touch system 500 includes an image sensing module 510, an image sensing module 530, a length-adjustable connecting device 550, a communication interface 560 and a processing circuit 570. The image sensing module 510 has a housing 5101 which has a transparent part 5102. The image sensing module 530 has a housing 5301 which has a transparent part 5302. Two terminals of the length-adjustable connecting device 550 respectively connect to the housings 5101 and 5301, and the length-adjustable connecting device 550 is configured to adjust a distance between the image sensing modules 510 and 530.

The length-adjustable connecting device 550 may adopt a multiple segmental length-adjustable rod structure or slide rail structure to realize length adjustment function, but the length-adjustable connecting device 550 of the present invention is not limited thereto. In addition, in this embodiment the communication interface 560 may be a wired communication interface, such as a universal serial bus (USB) interface, but not limited thereto. A specification of the USB interface may be USB 1.0, USB 1.1, USB 2.0 or USB 3.0. Please refer to FIG. 6, in which numerical references identical to those shown in FIG. 5 refer to the same components. FIG. 6 mainly shows that a length of the length-adjustable connecting device 550 may be shortened to an extent that the image sensing modules 510 and 530 are in contact with each other for easy to carry.

Please refer to FIG. 7, in which numerical references identical to those shown in FIG. 5 refer to the same components. A numerical reference 502 represents an object, such as the finger of a user or a pen-like object. In this embodiment, in addition to the housing 5101, the image sensing module 510 further includes an image sensor 512, an infrared (IR) filter 514 allowing only IR light to pass through, an optical lens set 516 composed of optical lenses 5161 and 5162, an IR emitter 518 and an optical lens 520; wherein the image sensor 512 may be a charge-coupled device (CCD) or a CMOS image sensor. The type of the image sensor 512 may be an array type or a linear type image sensor. In addition, in this embodiment a field of view of the image sensor 512 may be about 30 to 45 degrees and the image sensing module 510 adopts the optical lens set 516 to broaden the field of view of the image sensor 512 to at least 90 degrees such that a sensing area of the image sensing module 510 may cover at least the area within an included angle between dotted lines 582 and 584. In the optical lens set 516, each optical lens may increase at least 30 degrees field of view of the image sensor 512.

As for the IR emitter 518, the IR light emitted thereby illuminates the object 502 and an area covered within the included angle between the dotted lines 582 and 584 sequentially through the optical lens 520 and transparent part 5102 such that the image sensor 512 may acquire the image of the object 502 reflecting the IR light sequentially through the IR filter 514, optical lens set 516 and transparent part 5102. That is, a shape and a size of the transparent part 5102 have to be designed to allow the image sensor 512 to be able to acquire the image of the area covered within the included angle between the dotted lines 582 and 584, and the transparent part 5102 should not block the propagation of the IR light emitted from the IR emitter 518 and passing through the optical lens 520 and should allow the IR light to illuminate all places inside the area covered within the included angle mentioned above.

Similarly, in addition to the housing 5301, the image sensing module 530 further includes an image sensor 532, an IR filter 534 allowing only IR light to pass through, an optical lens set 536 composed of optical lenses 5361 and 5362, an IR emitter 538 and an optical lens 540. In this embodiment, a field of view of the image sensor 532 may be about 30 to 45 degrees and the image sensing module 530 adopts the optical lens set 536 to broaden the field of view of the image sensor 532 to at least 90 degrees such that a sensing area of the image sensing module 530 may cover at least the area within an included angle between dotted lines 582 and 586. In the optical lens set 536, each optical lens may increase at least 30 degrees field of view of the image sensor 532.

As for the IR emitter 538, the IR light emitted thereby illuminates the object 502 and an area covered within the included angle between the dotted lines 582 and 586 sequentially through the optical lens 540 and transparent part 5302 such that the image sensor 532 may acquire the image of the object 502 reflecting the IR light sequentially through the IR filter 534, optical lens set 536 and transparent part 5302. That is, a shape and a size of the transparent part 5302 have to be designed to allow the image sensor 532 to be able to acquire the image of the area covered within the included angle between the dotted lines 582 and 586, and the transparent part 5302 should not block the propagation of the IR light emitted from the IR emitter 538 and passing through the optical lens 540 and should allow the IR light to illuminate all places inside the area covered within the included angle mentioned above. In other embodiment, the IR emitter 518 may be disposed outside the image sensing module 510 and in the vicinity of the image sensing module 510 to illuminate the object 502 and the touch region 590; the IR emitter 538 may be disposed outside the image sensing module 530 and in the vicinity of the image sensing module 530 to illuminate the object 502 and the touch region 590. In addition, with proper design, only one of the IR emitters 518 and 538 is implemented and disposed in the vicinity of the image sensing module 510 or the image sensing module 530 to illuminate the object 502 and the touch region 590.

It is known from the above description that the included angle between the dotted lines 582 and 584 is about 90 degrees and that between the dotted lines 582 and 586 is also about 90 degrees. Therefore, a field of view of the image sensing module 510 and a field of view of the image sensing module 530 are partially overlapped and the partially overlapped field of views is used to define a touch region 590. In addition, it is known from FIG. 7 and the above description that the image sensor 512 is disposed substantially at an intersection of the dotted lines 582 and 584 while the image sensor 532 is disposed substantially at an intersection of the dotted lines 582 and 586. That is, the image sensors 512 and 532 are respectively disposed at two different angle/places of the touch region 590.

Figure 8:
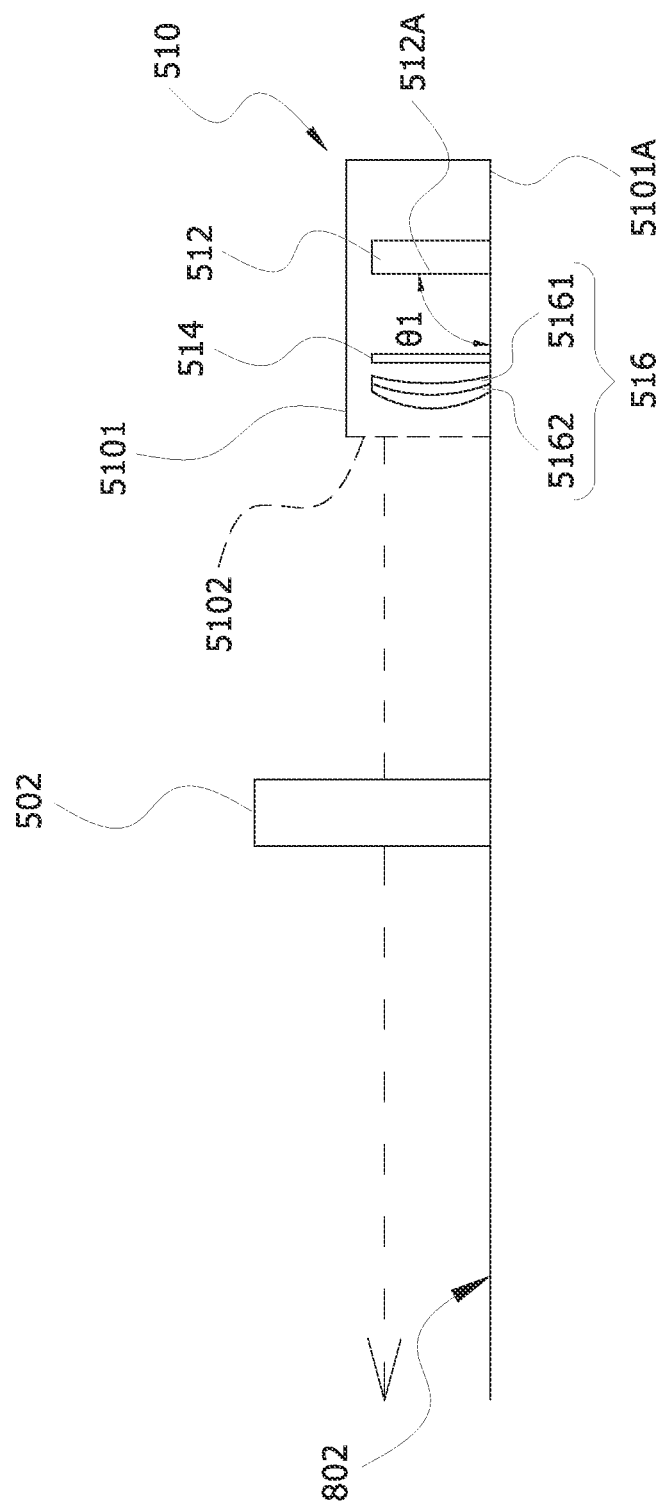
FIG. 8 shows a side perspective view of the image sensing module.

FIG. 8 shows a side perspective view of the image sensing module 510. In FIG. 8, numerical references identical to those shown in FIGS. 5 and 7 refer to the same components. A numerical reference 802 refers to an actual working surface. As shown in FIG. 8, there is a predetermined included angle $\theta 1$ between an image sensing surface 512A of the image sensor 512 and a bottom surface 5101A of the housing 5101, and the predetermined included angle $\theta 1$ is 90 degrees in this embodiment. In addition, the IR filter 514, optical lens set 516, IR emitter 518 (not shown in FIG. 8) and optical lens 520 (not shown in FIG. 8) are disposed in association with the predetermined included angle $\theta 1$. Since the predetermined included angle $\theta 1$ is 90 degrees, a theoretical field of view of the image sensor 512 is indefinite, i.e. a theoretical depth of field of the image acquired by the image sensor 512 is indefinite. However, an actual depth of field may be determined by the environment and physical limitations of the components themselves. In addition, if the IR light emitted by the IR emitter 518 covers the whole field of view of the image sensor 512, the object 502 may reflect the IR light for being detected by the image sensor 512 after entering the illuminated region of the IR light.

Similarly, the image sensor 532, IR filter 534, optical lens set 536, IR emitter 538 and optical lens 540 in the image sensing module 530 may also be arranged similar to FIG. 8.

Please refer to FIG. 7 again, in this embodiment the processing circuit 570 is disposed inside the housing 5101 of the image sensing module 510 and electrically coupled to the communication interface 560, image sensor 512 and image sensor 532. Therefore, when the object 502 is in the touch region 590, the image sensors 512 and 532 are able to acquire images of the object 502 reflecting the IR light, and then directly transmit acquired image data to the processing circuit 570. Or the image sensors 512 and 532 may preprocess the acquired image data to retrieve the character information of image (e.g. the parameter of area, length width ratio, boundary, color and/or brightness of the object image) and then transmit preprocessed results to the processing circuit 570 so as to reduce the loading of the processing circuit 570. The processing circuit 570 then calculates a position of the object 502 according to these image data or the character information of image. After obtaining the position of the object 502, the processing circuit 570 transmits information of the position of the object through the communication interface 560 to an electronic device, e.g. a notebook, to allow the electronic device to perform further operations according to the information of the position of the object. A method of obtaining the position of the object will be further illustrated hereinafter.

Figure 9:
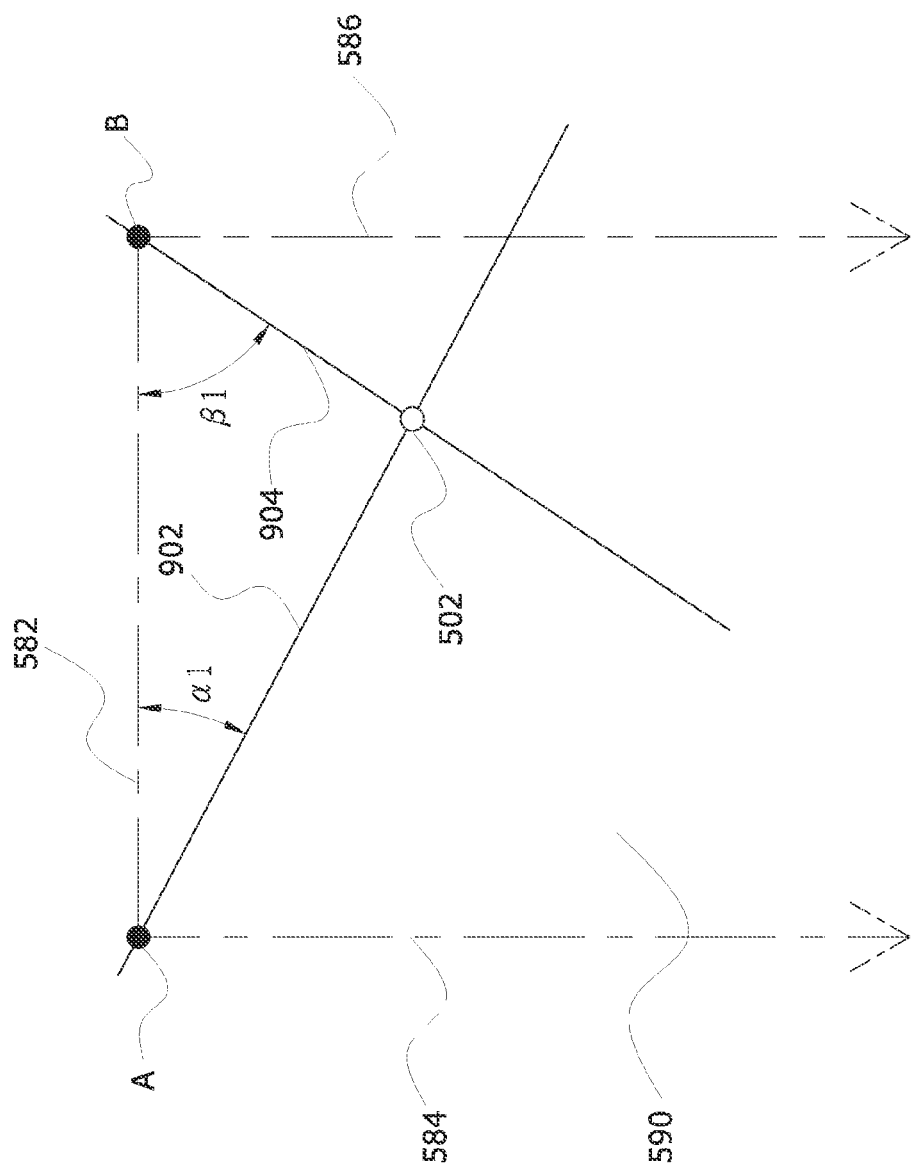
FIG. 9 shows an operation diagram of single point control of the portable optical touch system shown in FIG. 7.

FIG. 9 shows an operation diagram of the single point control of the portable optical touch system shown in FIG. 7. In FIG. 9, numerical references identical to those shown in FIG. 7 refer to the same components. In FIG. 9, a point A denotes the disposed position of the image sensor 512 and a point B denotes the disposed position of the image sensor 532. As shown in FIG. 9, when the object 502 is in the touch region 590, the image sensor 512 may detect the object 502 following the route 902 and the image sensor 532 may detect the object 502 following the route 904. Therefore, as long as the processing circuit 570 is able to obtain linear equations of the routes 902 and 904 respectively according to the images acquired by the image sensors 512 and 532, a cross point of these two routes may further be calculated so as to obtain the position of the object 502. A method of how the processing circuit 570 can obtain the linear equations of these two routes according to the images acquired by the two image sensors 512 and 532 will be further illustrated hereinafter.

Figure 10:
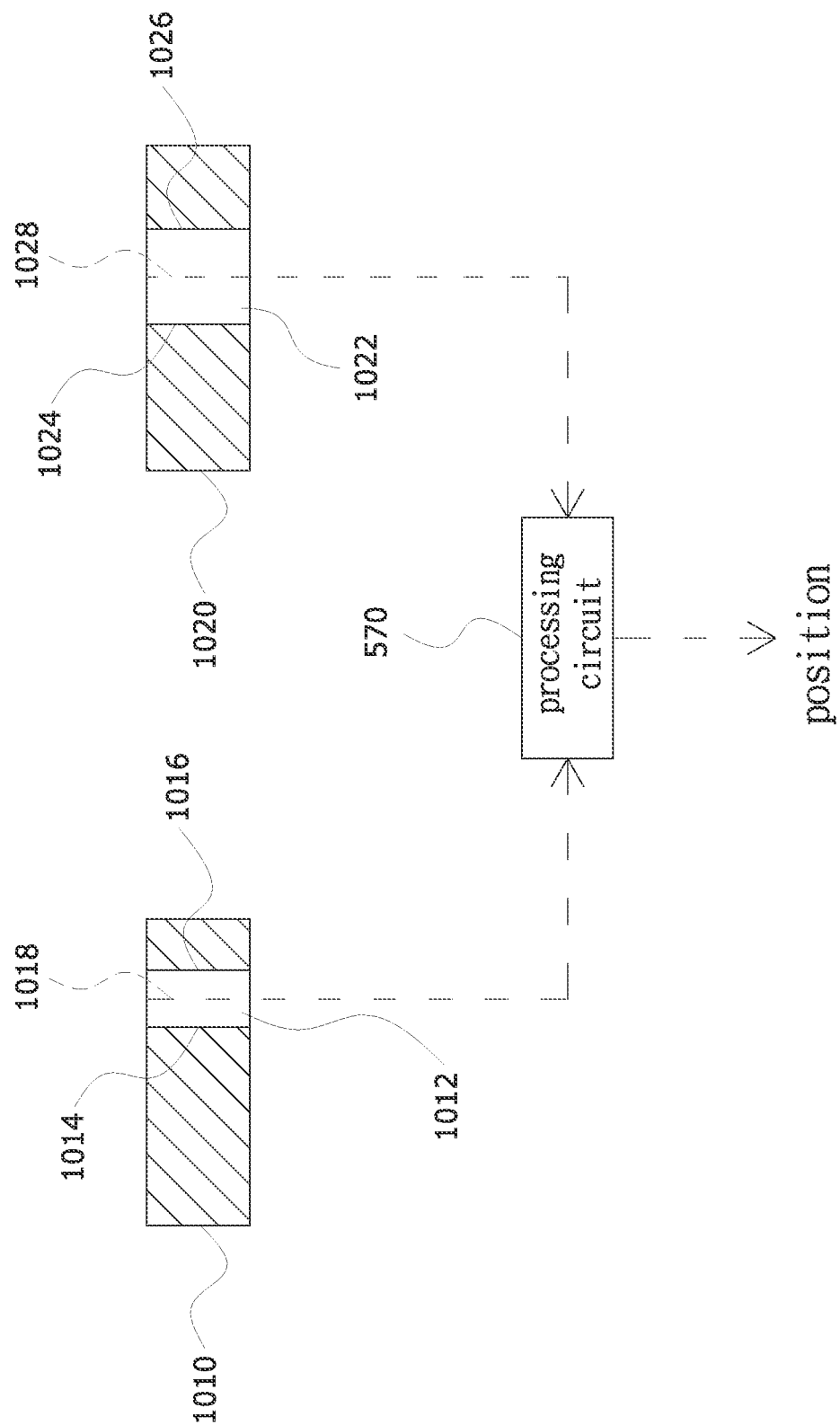
FIG. 10 shows a schematic diagram of the processing circuit receiving and post-processing image data from two image sensors.

FIG. 10 shows a schematic diagram of the processing circuit 570 receiving and post-processing the image data from the two image sensors 512 and 532. In FIG. 10, a numerical reference 1010 refers to an image acquired by the image sensor 512; a numerical reference 1012 refers to a bright zone in the image 1010 formed by sensing the IR light reflected by the object 502 (i.e. the object image); numerical references 1014 and 1016 respectively refer to the left edge and the right edge of the bright zone 1012; and a numerical reference 1018 refers to a center, a gravity center or a mean (or an average) of the bright zone 1012. Numerical references 1014, 1016 and 1018 refer to the character information of the object 502 in the image 1010 herein.

Similarly, a numerical reference 1020 refers to an image acquired by the image sensor 532; a numerical reference 1022 refers to a bright zone in the image 1020 formed by sensing the IR light reflected by the object 502 (i.e. the object image); numerical references 1024 and 1026 respectively refer to the left edge and the right edge of the bright zone 1022; and a numerical reference 1028 refers to a center, a gravity center or a mean (or an average) of the bright zone 1022. Numerical references 1024, 1026 and 1028 refer to the character information of the object 502 in the image 1020. In addition, other character information of the object 502, such as the parameter of area, length width ratio, boundary, color and/or brightness of the object image may also be processed by the processing circuit 570 or be preprocessed by the image sensors 512 and 532. In this embodiment, the character information is obtained by the processing circuit 570.

Figure 11:
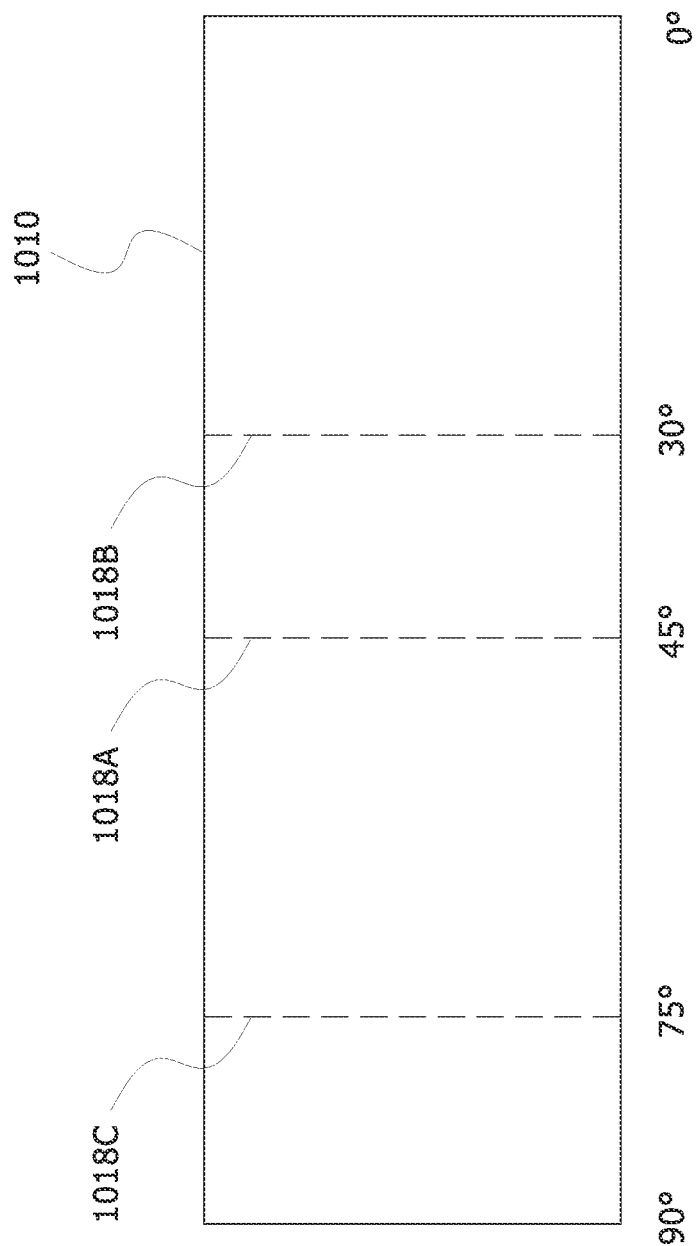
FIG. 11 shows a schematic diagram of corresponding angles relative to object positions in an image acquired by the image sensor.

FIG. 11 shows a schematic diagram of corresponding angles relative to object positions in an image acquired by the image sensor 512. As mentioned above, after receiving the image 1010, the processing circuit 570 calculates the center, the gravity center or the mean (or average) of the bright zone 1012, i.e. a position of the object 502 in the image 1010. Please refer to FIGS. 9, 10 and 11, in order to obtain the included angle $\alpha 1$ between the dotted line 582 and the route 902, the image 1010 may be averagely divided into a plurality of sections, e.g. 90 sections. Each section may represent 1 degree angle, and the right edge of the image 1010 may be defined as 0 degree and the left edge may be defined as 90 degrees. When the center, the gravity center or the mean (or average) of the object falls within the image 1010, the angle $\alpha 1$ corresponding to the position of the object can be obtained. For example, 1018A represents that the angle $\alpha 1$ is 45 degrees; 1018B represents that the angle $\alpha 1$ is 30 degrees; and 1018C represents that the angle $\alpha 1$ is 75 degrees. If an integral angle can not be obtained, an interpolation can be used to calculate the exact angle. Similarly, the angle $\beta 1$ can also be obtained by using similar method.

Please refer to FIG. 9, by using the position of point A and the angle $\alpha 1$ which are already known, a linear equation of the route 902 may be obtained by using point-slope form. Similarly, a linear equation of the route 904 may also be obtained according to the position of point B and the angle $\beta 1$. Therefore, the processing circuit 570 may calculate a cross point of these two routes and further obtain the position of the object 502. This kind of calculation method for the object position is called intersection of two lines. In addition, the portable optical touch system 500 may utilize other methods, e.g. the triangulation, to calculate the position of the object 502 and since this method has been broadly used in conventional optical touch systems, details thereof will not be repeated herein. Furthermore, according to the description above, a person skilled in the art can realize that the portable optical touch system 500 may also be used for multi-touch application.

Furthermore, in addition to the object 502 to be detected, other objects may also exist distantly in the field of views of the image sensors 512 and 532, and these objects may also reflect IR light to interfere the touch control of the optical touch system 500. The brightness of reflected IR light by an object may be used to identify whether an object image is valid or not. For example, but not limited to, a predetermined brightness threshold or a predetermined brightness range may be preset in the processing circuit 570, and the brightness of every pixel in the image acquired by the image sensors 512 and 532 may be compared with the predetermined brightness threshold or range. If the brightness of a pixel exceeds the predetermined brightness threshold or falls within the predetermined brightness range, the brightness of this pixel is confirmed to satisfy a predetermined standard. In this way, the brightness of every pixel will be examined sequentially in order to remove other objects and keep the object 502 to be detected.

It should be mentioned that in an actual design, the IR emitters 518 and 538 may be implemented by using at least one IR light emitting diode (LED), and the IR filters 514 and 534 may be implemented by using an IR-pass filter. The wavelength of the IR light emitted by the IR LED may be about 800 nm to 960 nm, and generally the IR LED emitting the IR light of about 850 nm wavelength is used. In addition, as the filed of view of an image sensor is generally 30 to 45 degrees, a number of the optical lenses adopted in the optical lens sets 516 and 536 may be properly designed according to the field of view of the image sensor and the field of view that one optical lens can increase. Although in this embodiment, the processing circuit 570 is disposed inside the housing 5101 of the image sensing module 510 and the communication interface 560 is coupled to the housing 5101 of the image sensing module 510, they are only exemplary rather than limitations to the arrangements of the processing circuit 570 and the communication interface 560. In addition, the surface of the object 502 mentioned above may be coated with reflecting material to increase the reflection efficiency thereof.

In addition, the communication interface 560 may also be a wireless communication interface, such as a bluetooth wireless communication interface, a wireless universal serial bus (wireless USB) interface or an ultra wide band (UWB) wireless interface. Furthermore, the communication interface 560 may use a plurality of wired communication interfaces and a plurality of wireless communication interfaces.

According to the above description, it is known that a range of the touch region 590 may be indefinite theoretically. However, a size of the touch region 590 may be limited by software. Please refer to FIG. 9 again, in the touch region 590 a length of the side denoted by the dotted line 582 is already known, and lengths of the two sides denoted by the dotted lines 584 and 586 are indefinite theoretically. In order to limit the length of the two sides denoted by the dotted lines 584 and 586 to a predetermined length, the processing circuit 570 may define different touch regions according to different applications. For example, if the optical touch system 500 is served as a virtual mouse, the size of the touch region 590 in front of the image sensing modules 510 and 530 may be defined according to a general size of a physical mouse familiar to a user, e.g. the touch region may have a size of 15 cm×15 cm (i.e. a length of dotted line 582×a length of dotted line 584). Or the processing circuit 570 may define the predetermined length of the dotted lines 584 and 586 in real time according to a relation between a size and a distance of the object image, or the predetermined length may be defined according to the brightness of reflected light of the object image, or the predetermined length of the dotted lines 584 and 586 may be defined in real time by combining the two methods mentioned above, and the definition method may be built in the software or the firmware adopted in the processing circuit 570. In this manner, the touch region 590 may be a quadrilateral touch region having a predetermined area.

As mentioned above, in the case of the touch region 590 having a predetermined area, the processing circuit 570 may first calculate the position of the object 502 and then identify whether the object 502 is inside the touch region 590. Only if the object 502 is inside the touch region 590, the processing circuit 570 will output information of the position of the object 502 through the communication interface 560. Of course, the processing circuit 570 may also first calculate the position of the object 502 and transmit the calculated information of the position of the object 502 through the communication interface 560 to the electronic device mentioned above to allow the electronic device to identify whether the object 502 is inside the touch region 590 and to determine whether to use the calculated information of the position of the object.

Second Embodiment

Figure 12:
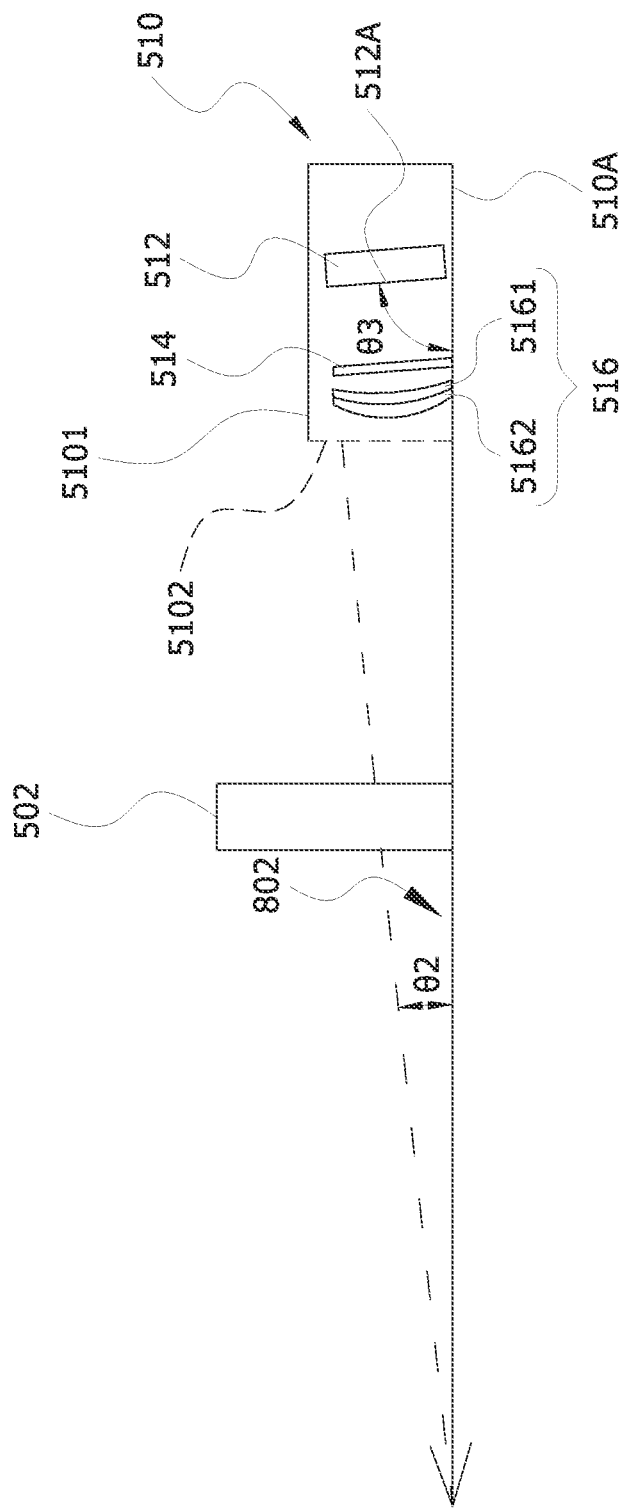
FIG. 12 shows another arrangement of internal components of the image sensing module.

This embodiment is mainly used to illustrate that the portable optical touch system 500 may also use the hardware to limit the field of views of the image sensors 512 and 532 from infinite to finite as shown in FIG. 12.

FIG. 12 shows another arrangement of internal components of the image sensing module 510. In FIG. 12, numerical references identical to those shown in FIG. 5 refer to the same components. As shown in FIG. 12, there is a predetermined included angle θ3 between the image sensing surface 512A of the image sensor 512 and the bottom surface 5101A of the housing 5101, and the predetermined included angle θ3 is smaller than 90 degrees in this embodiment. In addition, the IR filter 514, optical lens set 516, IR emitter 518 (not shown in FIG. 12) and optical lens 520 (not shown in FIG. 12) are disposed in association with the predetermined included angle θ3; wherein dispositions of the IR emitter 518 and the optical lens 520 have to allow the propagation direction of the IR light to be substantially parallel to the actual working surface 802. As the predetermined included angle θ3 is smaller than 90 degrees, the image sensor 512 has a limited field of view, i.e. a depth of field of the image acquired by the image sensor 512 is finite. In other embodiments, the predetermined included angle θ3 may also be larger than 90 degrees, and field of views of the image sensors may be defined in real time according to a relation between a size and a distance of the object image, or according to the brightness of reflected light of the object image, or by combining the two methods mentioned above.

Similarly, the image sensor 532, IR filter 534, optical lens set 536, IR emitter 538 and optical lens 540 in the image sensing module 530 may also be arranged similar to FIG. 12.

Figure 13:
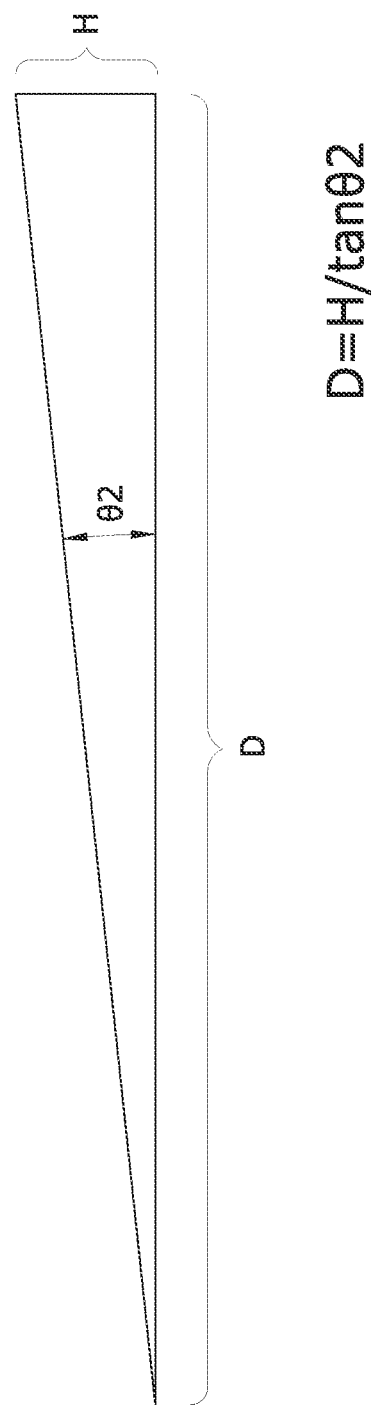
FIG. 13 shows a calculation method of the farthest field of view.

Please refer to FIG. 9 again, since the field of views of the image sensors 512 and 532 become limited, in the touch region 590 lengths of the two sides denoted by the dotted lines 584 and 586 may be defined by the farthest field of view detectable by the image sensors 512 and 532. The farthest field of view detectable by the image sensors may be calculated according to FIG. 13. In FIG. 13, D represents the farthest field of view that the image sensor 512 can detect (i.e. lengths of the dotted lines 584 and 586), H represents a height of the image sensor 512, and θ2 represents an angle. A relation between D, H and θ2 may be represented by an equation D=H/tan(θ2) shown in FIG. 13, and a sum of θ3 (refer to FIG. 12) and θ2 equals 90 degrees. For example, when H is 5 mm and θ2 is 1.91 degrees, D can be calculated from the equation H/tan(θ2) to be 150 mm.

Third Embodiment

Figure 14:
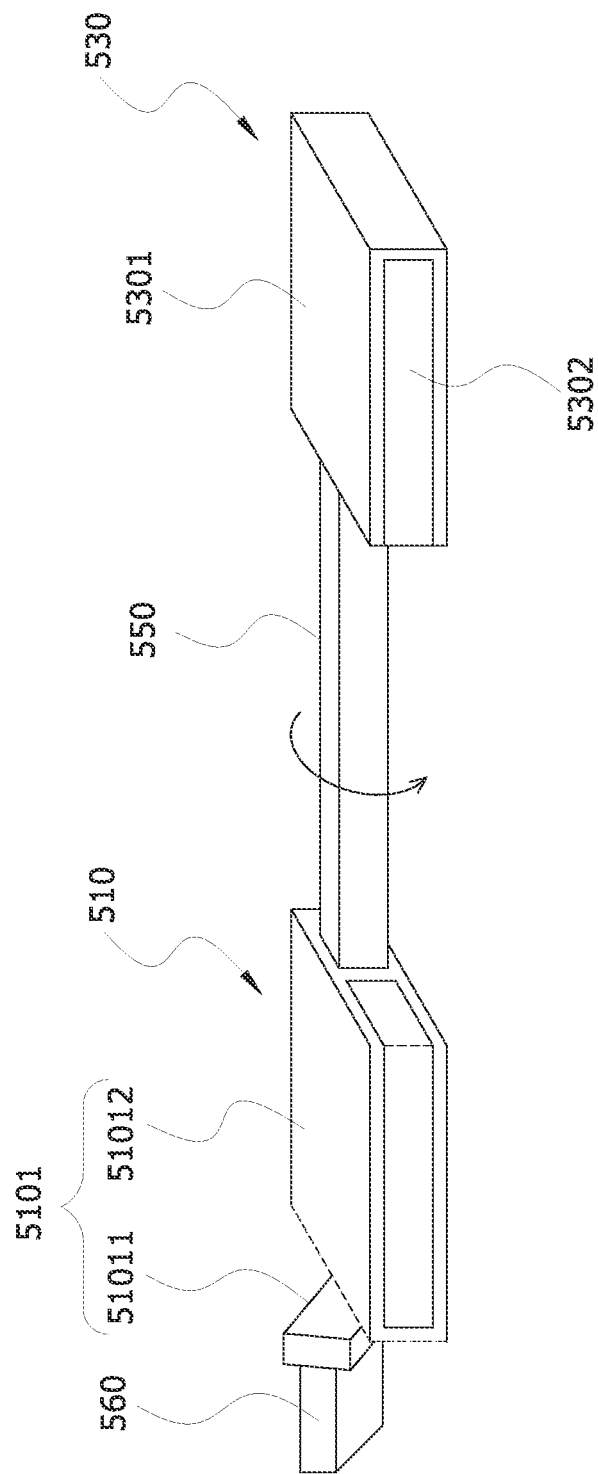
FIG. 14 shows a modified portable optical touch system.

This embodiment is mainly used to illustrate that the portable optical touch system 500 may use another hardware design to limit the field of views of the image sensors 512 and 532 from infinite to finite as shown in FIG. 14.

FIG. 14 shows a modified portable optical touch system 500. In FIG. 14, numerical references identical to those shown in FIG. 5 refer to the same components. In the optical touch system 500 shown in FIG. 14, a volume of the housing 5101 of the image sensing module 510 is enlarged, and the housing 5101 has a first body 51011 and a second body 51012. The communication interface 560 is coupled to the first body 51011 while the image sensor 512, IR filter 514, optical lens set 516, IR emitter 518, optical lens 520, processing circuit 570 and transparent part 5102 are all disposed in the second body 51012. The second body 51012 is configured to connect to the length-adjustable connecting device 550, and the second body 51012 is rotatable relative to the first body 51011.

As the length-adjustable connecting device 550 is connected to the second body 51012 and the housing 5301 of the image sensing module 530 is further connected to the length-adjustable connecting device 550, when the second body 51012 is rotated relative to the first body 51011, the length-adjustable connecting device 550 and the image sensing module 530 are also rotated by the same angle. In this manner, when the portable optical touch system 500 is put on or close to an actual working surface, the field of views of the image sensors 512 and 532 may be changed from infinite to finite according to the rotation angle.

Fourth Embodiment

From the teaching of the first embodiment, it is known that as long as the length-adjustable connecting device 550 of the portable optical touch system 500 has enough volume, the image sensing module 510 may not have the housing 5101, and the image sensor 512, IR filter 514, optical lens set 516, IR emitter 518 and optical lens 520 may be disposed in one terminal of the length-adjustable connecting device 550. Similarly, the image sensing module 530 may not have the housing 5301, and the image sensor 532, IR filter 534, optical lens set 536, IR emitter 538 and optical lens 540 may be disposed in the other terminal of the length-adjustable connecting device 550. Of course, the image sensors 512 and 532 still need to have partially overlapped field of views such that the partially overlapped field of views may be used to define a touch region. As for the communication interface 560 and the processing circuit 570, they may be disposed at will as long as the processing circuit 570 is still electrically coupled to the communication interface 560, the image sensor 512 and the image sensor 532.

It should be mentioned that in this embodiment, the image sensors 512 and 532 may have infinite field of views theoretically.

Fifth Embodiment

From the teachings of the fourth and the second embodiments, it is known that in the portable optical touch system 500 of the fourth embodiment, the image sensors 512 and 532 may be designed to rotate about an axis of the length-adjustable connecting device 550 by a predetermined angle, and the predetermined angle is smaller than 90 degrees. Of course, the IR filter 514, optical lens set 516, IR emitter 518 and optical lens 520 also have to be properly adjusted corresponding to a rotation angle of the image sensor 512; and the IR filter 534, optical lens set 536, IR emitter 538 and optical lens 540 also have to be properly adjusted corresponding to a rotation angle of the image sensor 532. In this manner, when the portable optical touch system 500 is put on an actual working surface, the field of views of the image sensors 512 and 532 may be changed from infinite to finite according to the rotation direction.

Sixth Embodiment

This embodiment is mainly used to illustrate that in the portable optical touch system adopting an IR emitter, at least one optical lens in every optical lens set is alternatively coated with a plurality of MgO layers and a plurality of $TiO_2$ or $SiO_2$ layers such that the at least one optical lens can have the function of an IR filter. Accordingly, the original IR filter may not be implemented in this embodiment.

It should be mentioned that, the original IR filter refers to so called photo resistor and the material thereof includes organic compound, polymer and plastic.

Seventh Embodiment

This embodiment is mainly used to illustrate that in the portable optical touch system adopting an IR emitter, each IR emitter may be replaced by a laser emitting device and every IR filter may not be implemented. In addition, each optical lens in every optical lens set may not be coated with the MgO, $TiO_2$ and $SiO_2$ layers. It should be noted that, each optical lens disposed in front of the laser emitting device has to be able to convert a point light source emitted by the associated laser emitting device to a linear light source to have the laser light emitted by the associated laser emitting device be able to cover at least the touch region. In this manner, the laser light emitted by every laser emitting device may illuminate the object inside the touch region, and every image sensor is able to acquire the image of the object reflecting the laser light. In other embodiments, the laser emitting device may be disposed outside the image sensing module and in the vicinity of the image sensing module to illuminate the object 502 and the touch region 590. In addition, with proper design, at least one laser emitting device is implemented and disposed in the vicinity of the image sensing module 510 and/or the image sensing module 530 to illuminate the object 502 and the touch region 590, and the portable optical touch system 500 further includes at least one optical lens (or optical lens set) disposed in front of the at least one laser emitting device and configured to convert a point laser light to a linear laser light to illuminate the object 502 and the touch region 590.

It should be mentioned that, each laser emitting device may be implemented by using at least one laser diode.

Eighth Embodiment

This embodiment is mainly used to illustrate that in the portable optical touch system adopting a length-adjustable connecting device, the length-adjustable connecting device may be replaced by a connecting device having a fixed length.

Ninth Embodiment

This embodiment is mainly used to illustrate that in the portable optical touch system of the present invention the processing circuit may be designed to be able to further define a function pattern inside the touch region for implementing a virtual user input device such as a mouse, a keyboard, a touchpad or a switch. Taking the portable optical touch system of the second embodiment as an example, its processing circuit may be designed to further define a function pattern having the mouse function inside the touch region as shown in FIG. 15.

Figure 15:
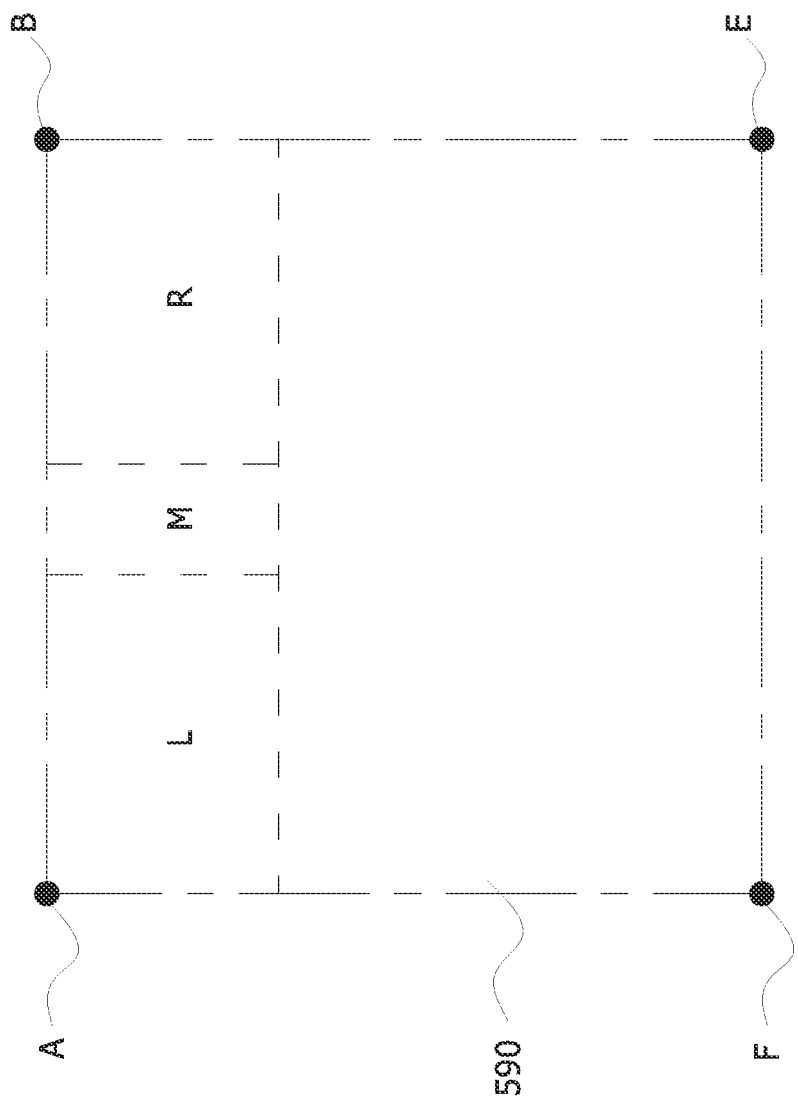
FIG. 15 shows a function pattern of the mouse in the touch region defined by the processing circuit.

FIG. 15 shows the function pattern of a mouse in the touch region defined by the processing circuit mentioned above. In FIG. 15, the parallelogram formed by connecting lines between points A, B, E and F refers to the touch region 590 herein, wherein the points A and B are the positions of the two image sensors in the portable optical touch system. In addition, the region L is a virtual left button of a mouse, the region M is a virtual roller of a mouse, and the region R is a virtual right button of a mouse. In this manner, a user may operate by using the mouse function emulated by this touch region 590.

Tenth Embodiment

This embodiment is mainly used to illustrate that in the portable optical touch system of the ninth embodiment, a light projector may further be implemented to project the function pattern defined by the processing circuit on an actual working surface, such as projecting a function pattern having the mouse function, keyboard function, etc. A light source of this light projector may be a visible laser light source or a visible IR light source.

Eleventh Embodiment

The first embodiment pointed out that after obtaining the position of an object, the processing circuit may transmit information of the position through the communication interface to an electronic device. This embodiment is mainly used to illustrate that if this electronic device has a display screen, e.g. a notebook, the processing circuit in the portable optical touch system of the present invention may be designed to communication with this electronic device though the communication interface to correlate the position of the object to a cursor position on the display screen of this electronic device.

Twelfth Embodiment

Figure 16:
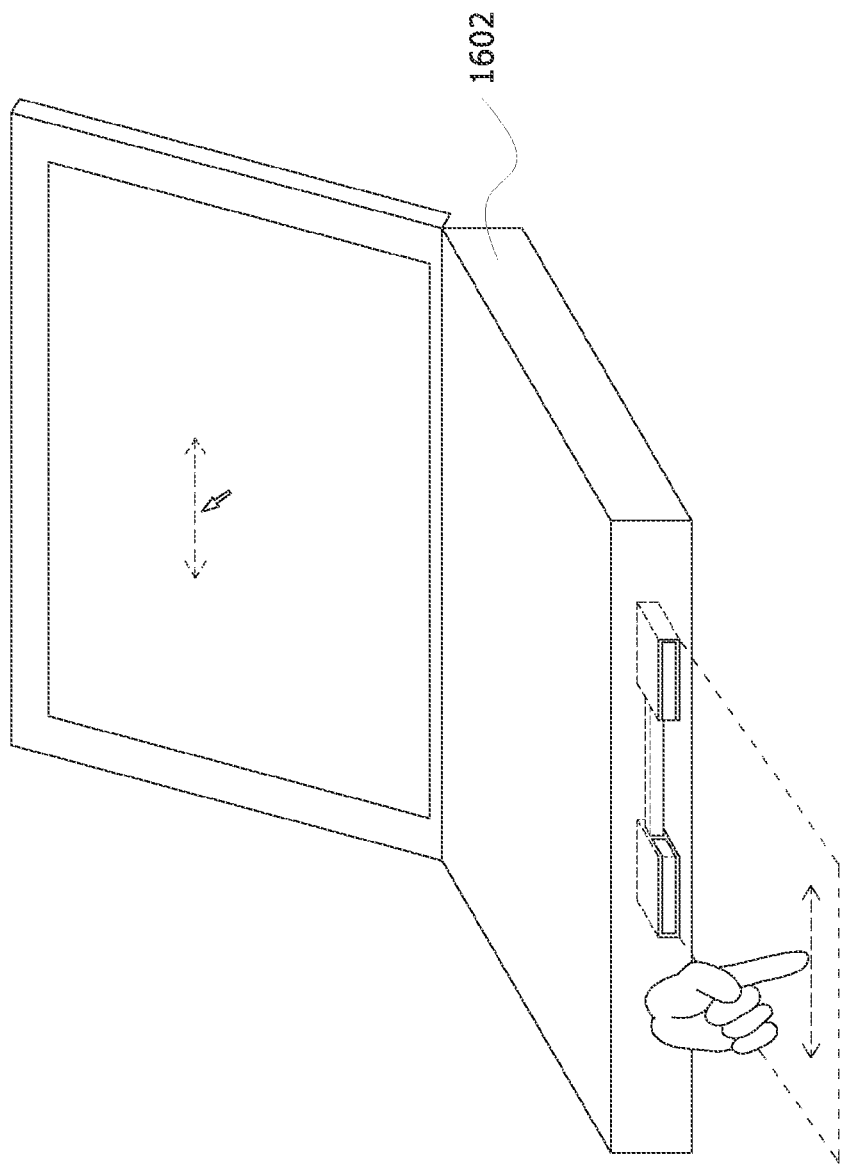
FIG. 16 shows a schematic diagram of the portable optical touch system of the present invention being disposed in a slot of an electronic device.

This embodiment is mainly used to illustrate that on the housing of the electronic device mentioned in the eleventh embodiment, a slot may further be formed thereon such that the portable optical touch system of the present invention may be disposed in the slot as shown in FIG. 16. FIG. 16 shows a schematic diagram of the portable optical touch system of the present invention being disposed in a slot of an electronic device. The electronic device 1602 shown in FIG. 16 uses a notebook as an example.

Thirteenth Embodiment

From the teaching of the twelfth embodiment, it is known that if the portable optical touch system of the present invention is built in a portable electronic device having a display screen, this electronic device may also be called a portable optical touch system. Of course, in a built-in portable optical touch system, a length-adjustable or an unadjustable (fixed) connecting device may not be implemented. In addition, the built-in portable optical touch system may adopt an IR emitter or a laser emitting device to illuminate the object in the touch region.

Fourteenth Embodiment

From the teachings of the above embodiments, it is known that if the object to be detected can illuminate by itself, e.g. emitting IR light or laser light, the aforementioned portable optical touch systems may not adopt an IR emitter or a laser emitting device to illuminate the object. Of course, the optical lens disposed in front of the IR emitter or laser emitting device and other associated components may not be implemented.

Figure 17:
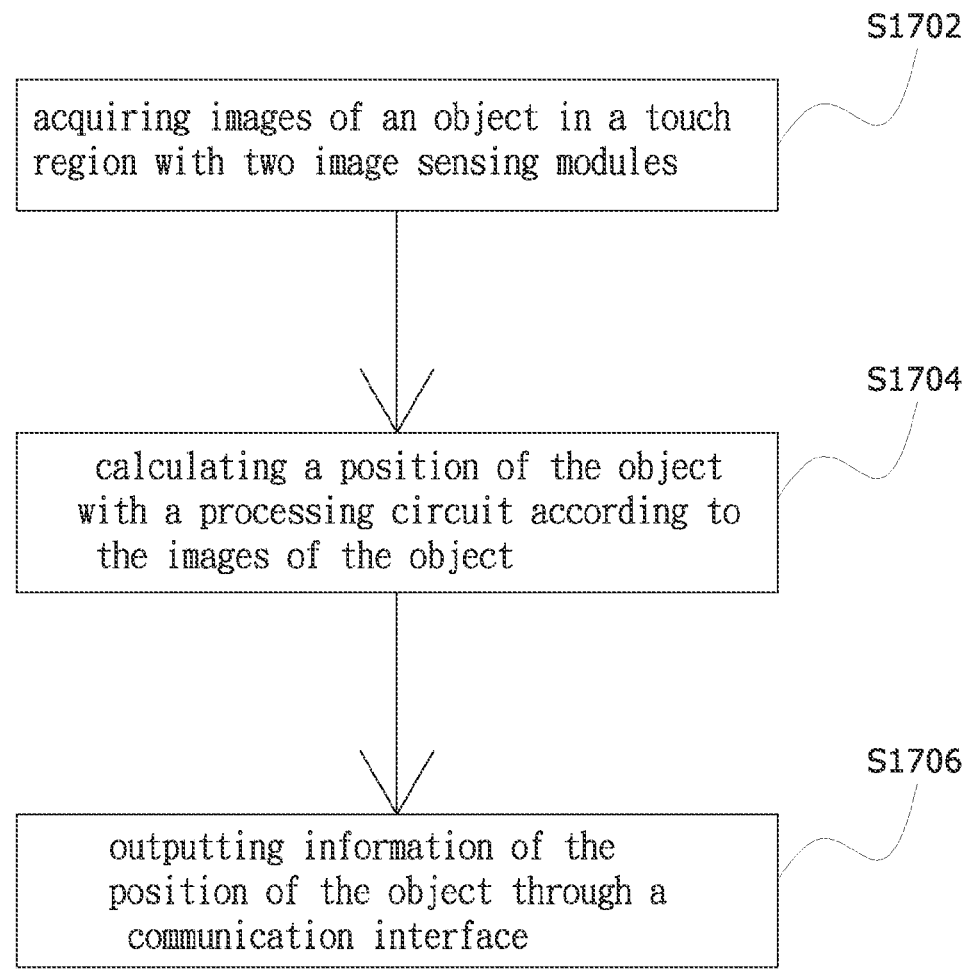
FIG. 17 shows a flow chart of the method for detecting an object position according to an embodiment of the present invention.

According to the above embodiments of the portable optical touch system adopting a connecting device, a basic flow chart of the method for detecting the object position can be concluded as shown in FIG. 17. FIG. 17 shows a flow chart of the method for detecting a position of at least one object according to an embodiment of the present invention. The method may be adapted to a portable optical touch system that includes a first image sensing module, a second image sensing module, a connecting device, a processing circuit and a communication interface; wherein a field of view of the first image sensing module and a field of view of the second image sensing module are partially overlapped and the partially overlapped field of views is for defining a touch region. The connecting device is configured to adjust or fix a distance between the first and second image sensing modules. The method includes the steps of: acquiring images of the object in the touch region by using the first and second image sensing modules (Step S1702); calculating the position of the object by using the processing circuit according to the images of the object acquired by the first and second image sensing modules (Step 1704); and outputting information of the position of the object through the communication interface (Step 1706); wherein the processing circuit may calculate the position of the object by using triangulation or intersection of two lines.

Fifteenth Embodiment

Figure 18:
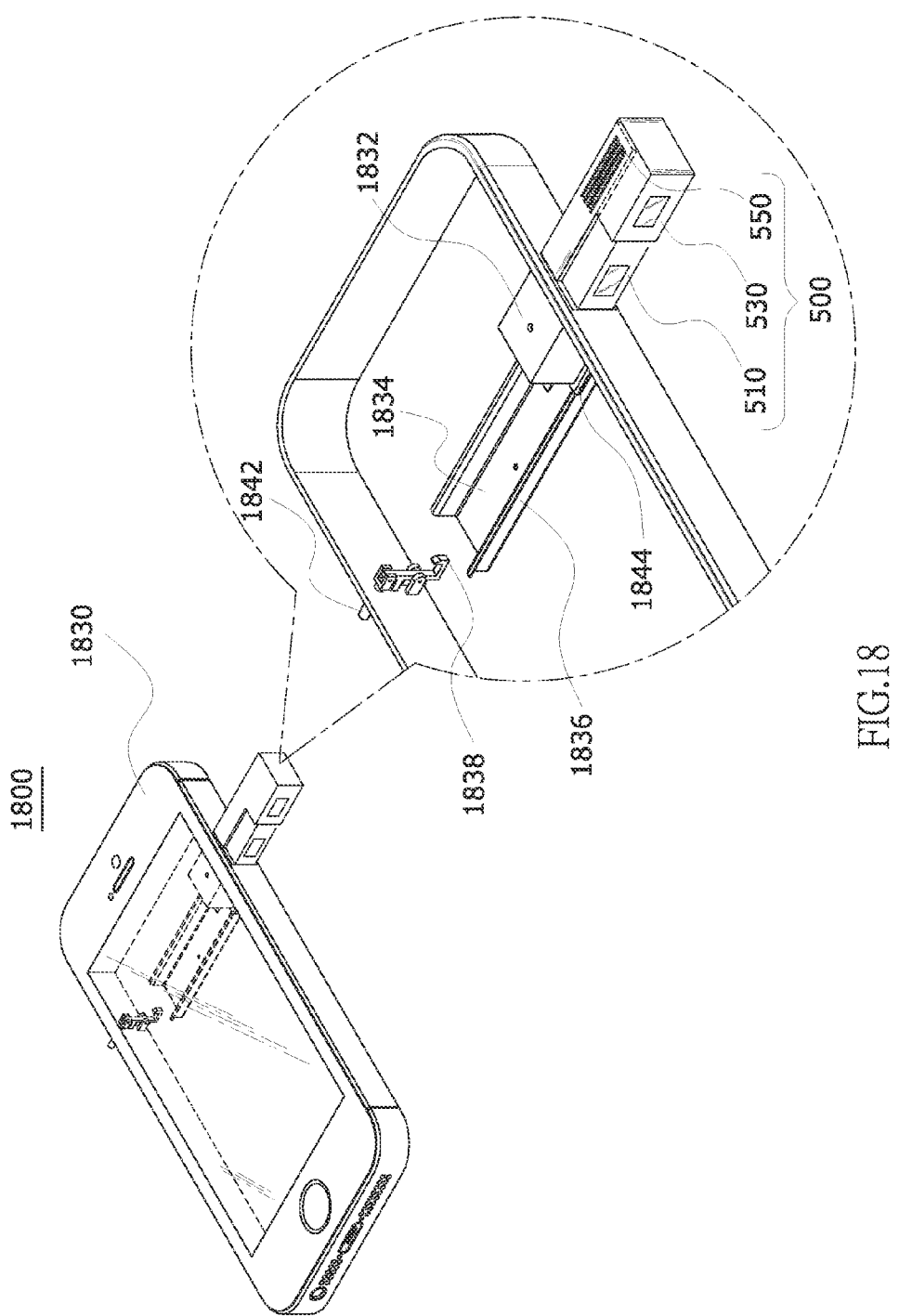
FIG. 18 shows a solid diagram of the electronic apparatus according to an embodiment of the present invention.
Figure 19:
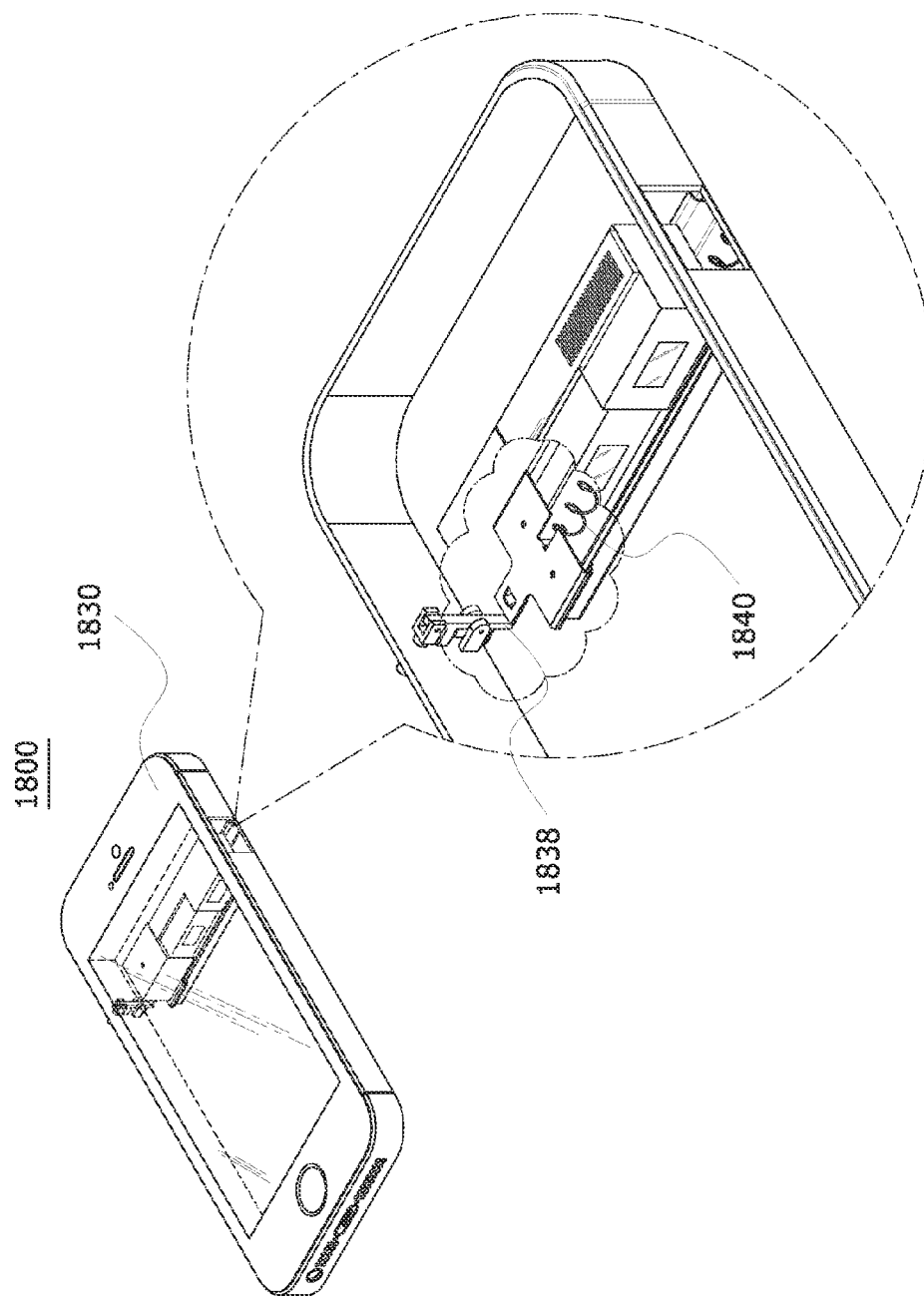
FIG. 19 shows another solid diagram of the electronic apparatus according to an embodiment of the present invention.

FIG. 18 shows a solid diagram of the electronic apparatus according to an embodiment of the present invention; FIG. 19 shows another solid diagram of the electronic apparatus according to an embodiment of the present invention. The electronic apparatus 1800 includes electronic device 1830 and the portable optical touch system 500. The electronic device 1830 includes an auxiliary device 1832 and a slot 1834. The auxiliary device 1832 has a using state and an accommodating state. The auxiliary device 1832 is accommodated inside the slot 1834. The portable optical touch system 500 is connected with the auxiliary device 1832. In the embodiment, the auxiliary device 1832 facilitates, for example, interchange of the portable optical touch system 500 between the using state and the accommodating state.

Specifically, as shown in FIG. 18, in the using state, the auxiliary device 1832 moves out of the slot 1834 such that the portable optical touch system 500 is in the exterior of the slot 1834. That is, when the user uses the portable optical touch system 500, the portable optical touch system 500 is moved out of the electronic device 1830 by the auxiliary device 1832, so as to perform an operation for sensing an image. As shown in FIG. 19, in the accommodating state, the auxiliary device 1832 moves into the slot 1834 such that the portable optical touch system 500 is moved into the interior of the slot 1834. That is, when the user does not use the portable optical touch system 500, the portable optical touch system 500 is accommodated in the electronic device 1830 by the auxiliary device 1832.

Furthermore, the portable optical touch system 500 includes the first image sensing module 510, the second image sensing module 530, the length-adjustable connecting device 550, the communication interface 560 and the processing circuit 570 as shown in FIG. 7. The field of view of the first image sensing module 510 and the field of view of the second image sensing module 530 are partially overlapped and the partially overlapped field of views is for defining a touch region 590. The length-adjustable connecting device 550 is connected to the first image sensing module 510 and the second image sensing module 530, wherein the length-adjustable connecting device 550 adjusts a distance between the first image sensing module 510 and the second image sensing module 530.

The processing circuit 570 calculates a position of the object 502 in the touch region 590 according to images of the object 502 acquired by the first image sensing module 510 and the second image sensing module 530, and outputs information of the position through the communication interface 560.

In one embodiment of FIG. 18, the electronic device 1830 further includes a sliding rail 1836 and snap member 1838. The sliding rail 1836 locates inside the slot for facilitating accommodating the auxiliary device 1832 and the portable optical touch system 500. The auxiliary device 1832 facilitates moving the portable optical touch system 500 out of the exterior of the slot 1834 or into the interior of the slot 1834 along the sliding rail 1836. The snap member 1838 snaps the auxiliary device 1832 when the auxiliary device 1832 moves the portable optical touch system 500 into the interior of the slot 1834. Moreover, in one embodiment, the electronic device 1830 further includes a flexible member 1840. The flexible member 1840 is disposed in the sliding rail 1836 and drives the auxiliary device 1832 to move the portable optical touch system 500 out of the exterior of the slot 1834.

Furthermore, in FIG. 18. the electronic device 1830 further includes a driving member 1842. The driving member 1842 is disposed outside the electronic device 1830 and connects the snap member 1838. When the driving member 1842 drives the snap member 1838, the snap member 1838 separates from the auxiliary device 1832 such that the flexible member 1840 drives the auxiliary device 1832 to move the portable optical touch system 500 out of the exterior of the slot 1834.

In one embodiment of FIG. 18, the electronic device 1830 further includes a limiting component 1844. The limiting component 1844 is disposed on two opposite sides of the sliding rail 1836 and limits a moving location of the auxiliary device 1832. That is, when the auxiliary device 1832 moves the portable optical touch system 500 out of the slot 1834, the limiting component 1844 limits the auxiliary device 1832 in the interior of the slot 1834 (i.e. the interior of the electronic device 1830) and only the portable optical touch system 500 is exposed outside the slot 1834.

Figure 20:
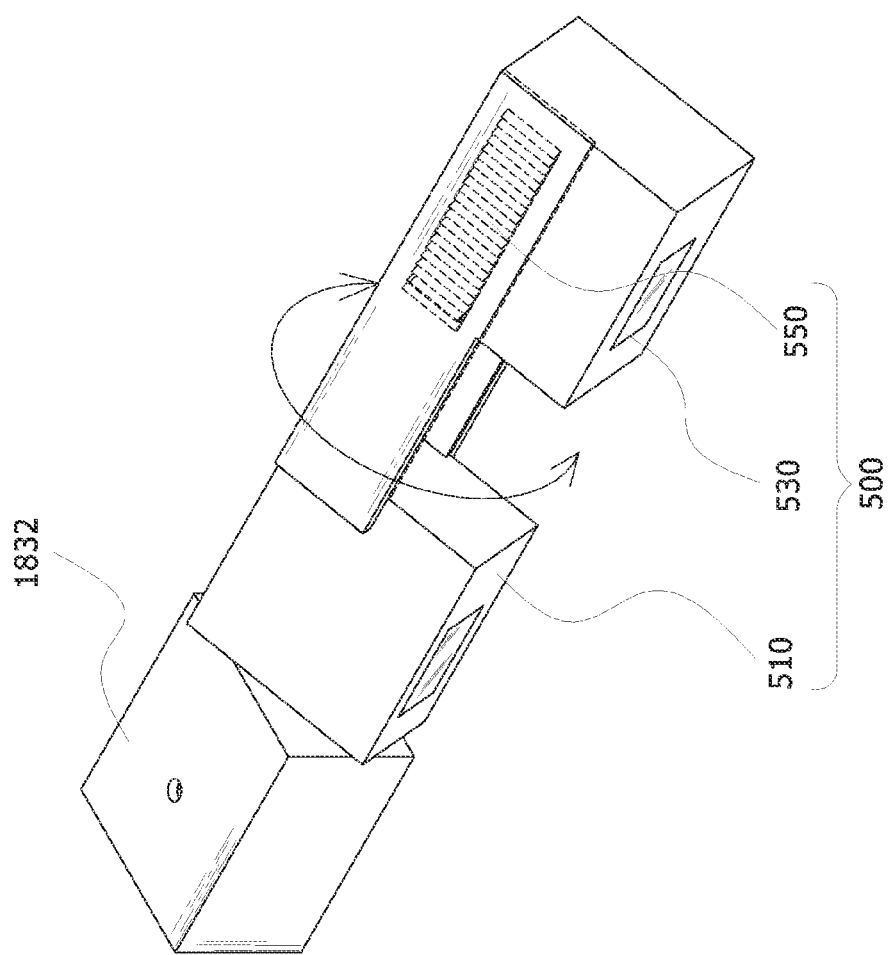
FIG. 20 shows a diagram of the portable optical touch system pivoted on the auxiliary device according to an embodiment of the present invention.

As shown in FIG. 20, in one embodiment, the portable optical touch system 500 is pivoted on the auxiliary device 1832. That is, when the portable optical touch system 500 is in the exterior of the slot 1834, the portable optical touch system 500 is pivoted to change a location, an angle or an area of the touch region 590 for facilitating usage.

Figure 21:
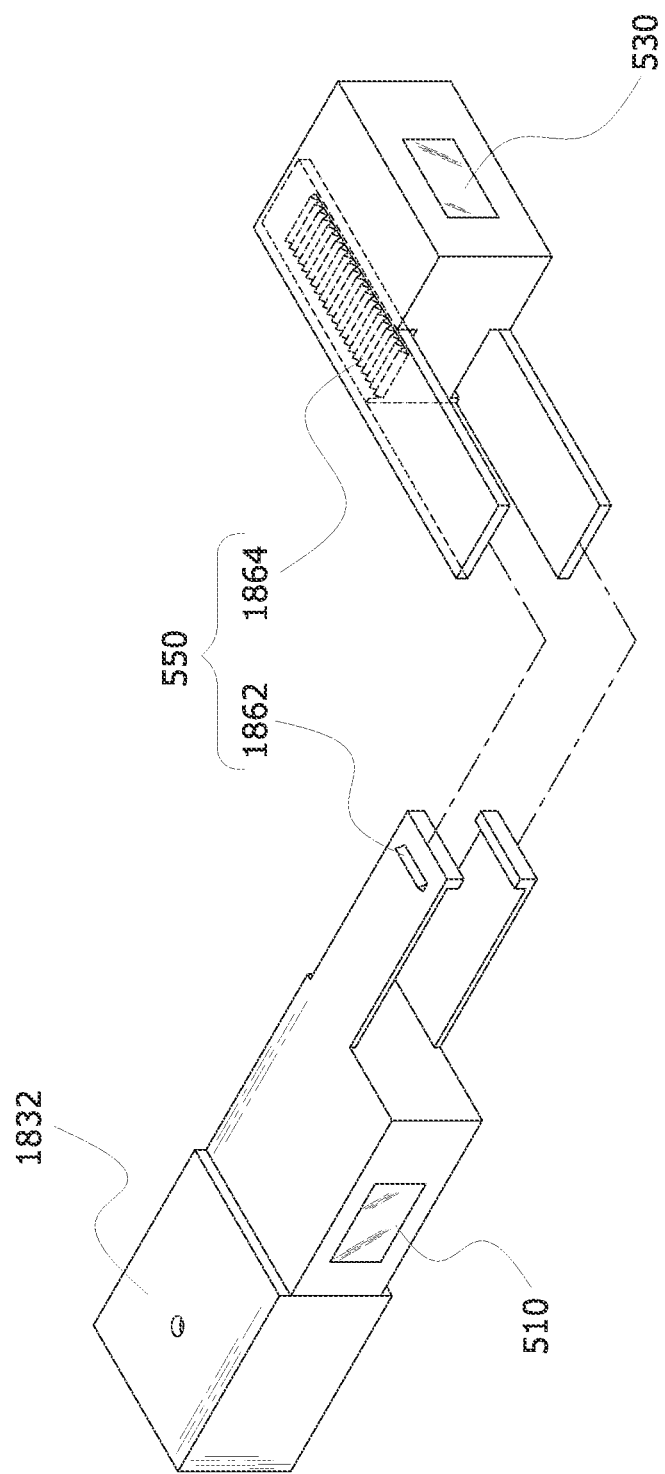
FIG. 21 shows a diagram of the length-adjustable connecting device according to an embodiment of the present invention.

As shown in FIG. 21, in the embodiment, the length-adjustable connecting device 550 includes a first positioning member 1862 and a second positioning member 1864. The first positioning member 1862 has a protrusion. The second positioning member 1864 has a plurality of recessions arranged in sequence, and the recessions respectively correspond to the protrusion. When the length-adjustable connecting device 550 is moved, the protrusion is engaged with one of the recessions, so as to adjust the distance between the image sensing module 510 and second image sensing module 530.

In the embodiment, the first positioning member 1862 is flexible. Therefore, when the length-adjustable connecting device 550 is moved, the protrusion of the first positioning member 1862 is disengaged from the corresponding recession of the second positioning member 1864 and engaged with another corresponding recession of the second positioning member 1864 through the flexible feature of the first positioning member 1862.

Sixteenth Embodiment

Figure 22:
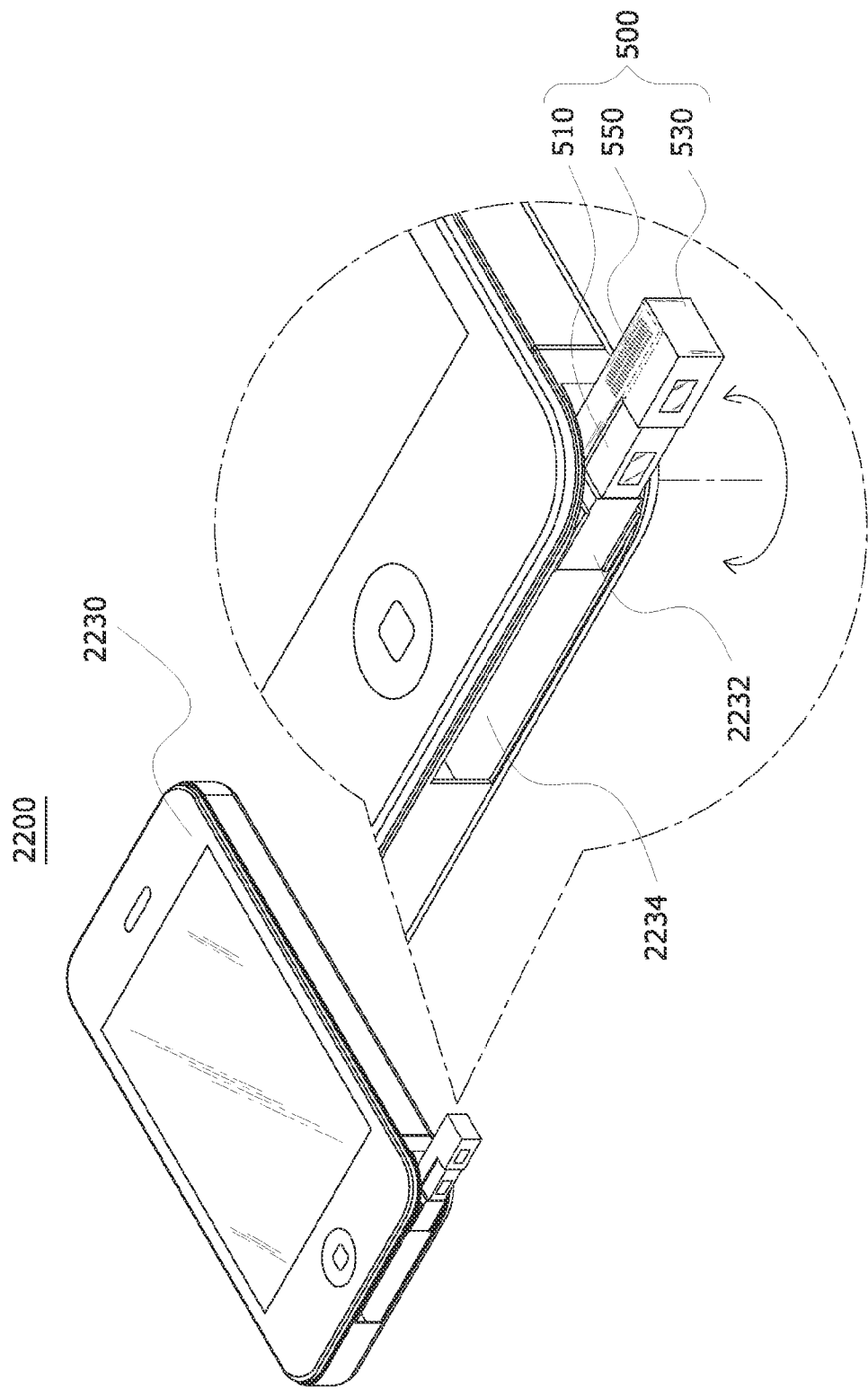
FIG. 22 shows a solid diagram of the electronic apparatus according to an embodiment of the present invention.
Figure 23:
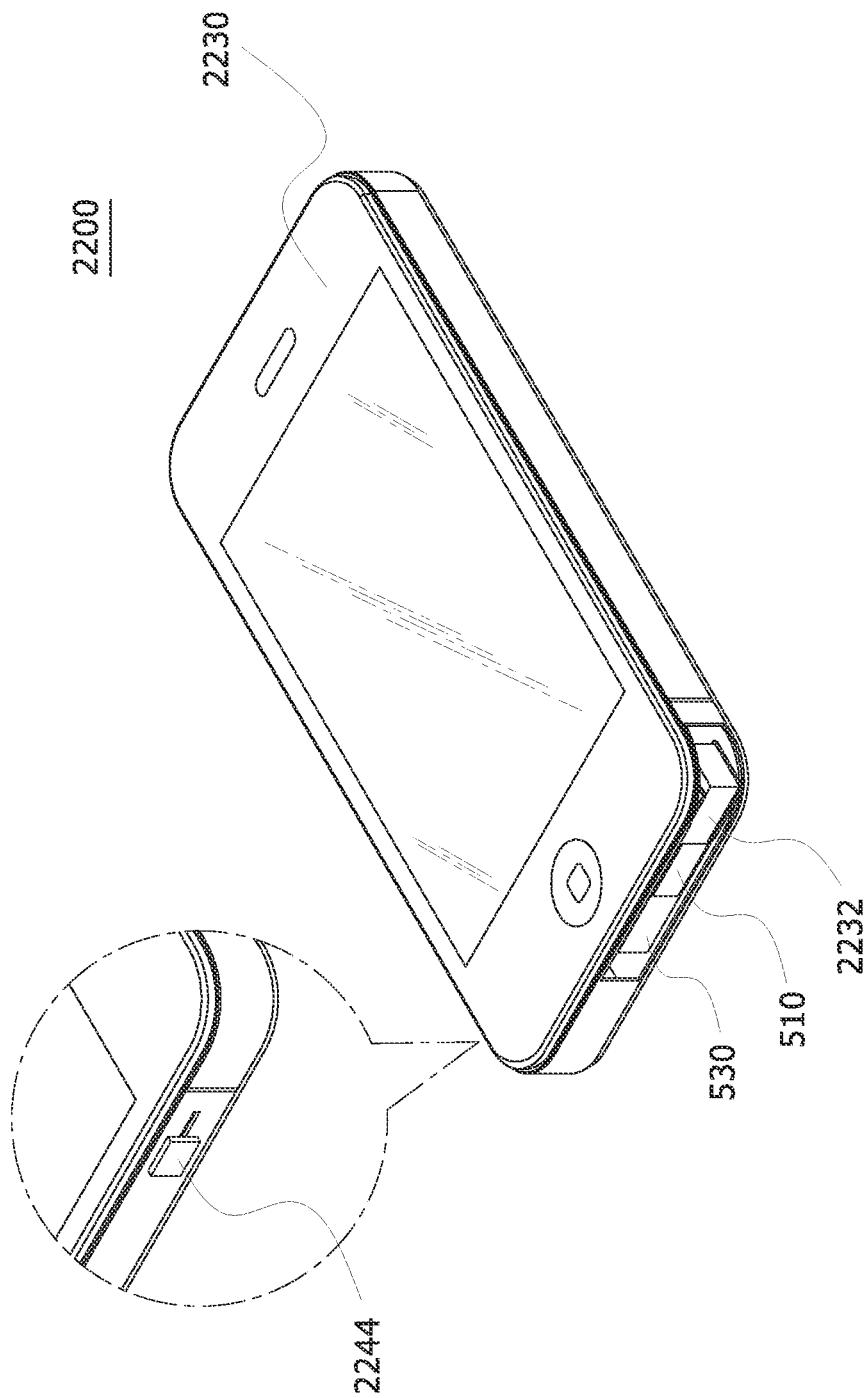
FIG. 23 shows another solid diagram of the electronic apparatus according to an embodiment of the present invention.

FIG. 22 shows a solid diagram of the electronic apparatus according to an embodiment of the present invention; FIG. 23 shows another solid diagram of the electronic apparatus according to an embodiment of the present invention. The electronic apparatus 2200 includes an electronic device 2230 and a portable optical touch system 500. The electronic device 2230 includes a auxiliary device 2232 and a slot 2234. The auxiliary device 2232 has a using state and an accommodating state. The auxiliary device 2232 is accommodated inside the slot 2234. The portable optical touch system 500 is connected with the auxiliary device 2232. In the embodiment, the auxiliary device 2232 facilitates, for example, interchange of the portable optical touch system 500 between the using state and the accommodating state.

Specifically, as shown in FIG. 22, in the using state, the auxiliary device 2232 rotates the portable optical touch system 500 out of the slot 2234. That is, when the user uses the portable optical touch system 500, the portable optical touch system 500 is moved out of the electronic device 2230 by rotating the auxiliary device 2232, so as to perform an operation for sensing an image. As shown in FIG. 23, in the accommodating state, the auxiliary device 2232 rotates the portable optical touch system 500 into the slot 2234. That is, when the user does not use the portable optical touch system 500, the portable optical touch system 500 is accommodated into the electronic device 2230 by rotating the auxiliary device 2232.

Figure 24:
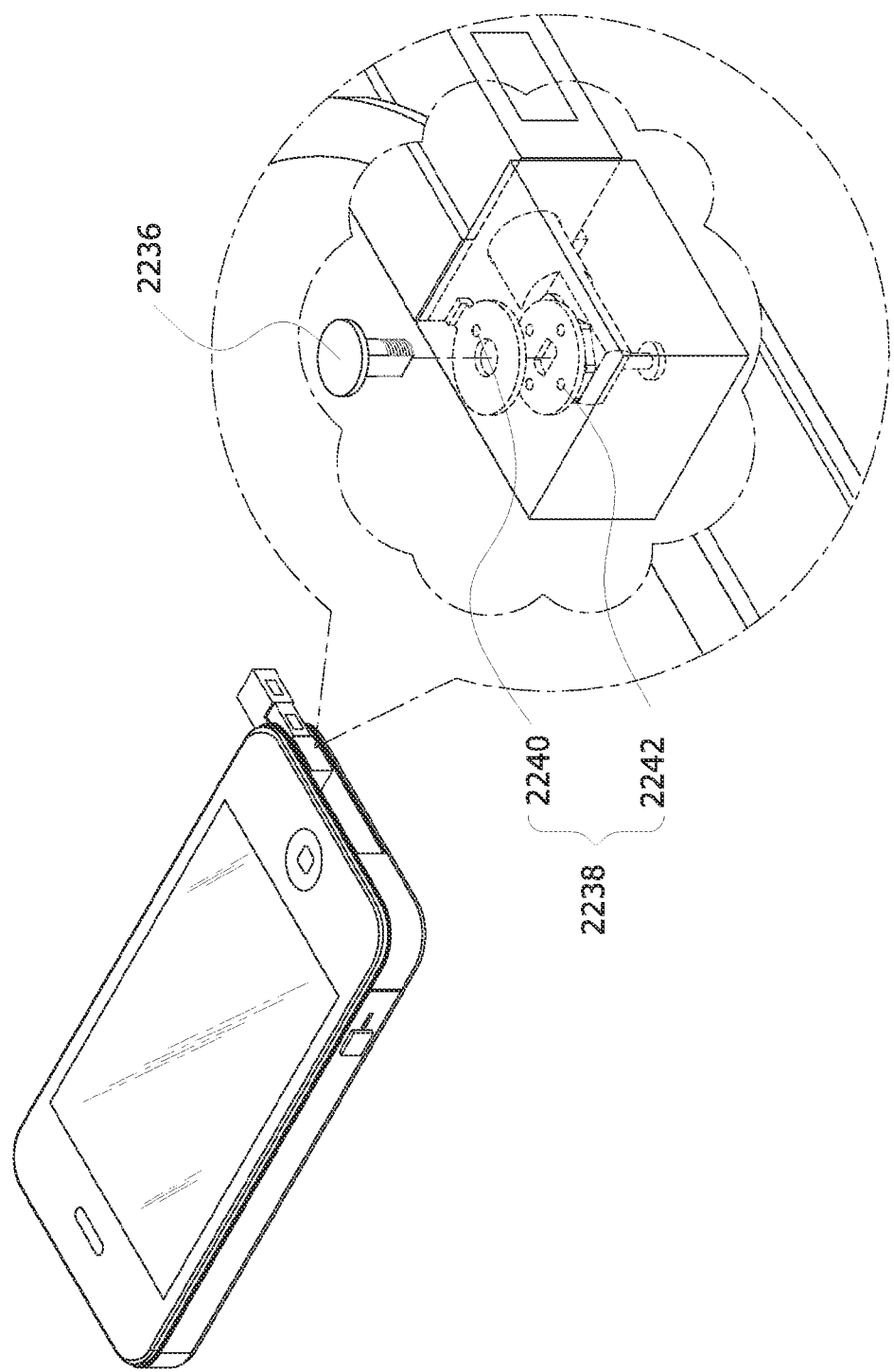
FIG. 24 shows a diagram of the auxiliary device according to an embodiment of the present invention.

As shown in FIG. 24, in the embodiment, the auxiliary device 2232 includes a lock member 2236 and a rotating member 2238. The lock member 2236 locks the auxiliary device 2232 on the electronic device 2230. The rotating member 2238 connects the lock member 2236 and the portable optical touch system 500. The rotating member 2238 includes a third positioning member 2240 and a fourth positioning member 2242.

The third positioning member 2240 is disposed on the lock member 2236 and has a protrusion. The fourth positioning member 2242 has a plurality of recessions arranged in sequence, and the recessions of the fourth positioning member 2242 are respectively corresponded the protrusion of the third positioning member 2240.

That is, when the portable optical touch system 500 is rotated by the rotating member 2238, the protrusion of the third positioning member 2240 is engaged with one of the recessions of the fourth positioning member 2242, so as to adjust the rotating angle of the portable optical touch system 500. The third positioning member is a flexible. Therefore, when the portable optical touch system 500 is rotated by the rotating member 2238, the protrusion of the third positioning member 2240 is disengaged from the corresponding recession of the fourth positioning member 2242 and engaged with another corresponding recession of the fourth positioning member 2242 through the flexible feature of the third positioning member 2240.

Furthermore, in the embodiment of FIG. 23, the electronic device 2230 includes a driving member 2244. The driving member 2244 is disposed outside the electronic device 2230 and is adjacent to the portable optical touch system 500. The driving member 2244 drives the portable optical touch system 500 such that a portion of portable optical touch system 500 is moved out of the slot 2234. Then, the portable optical touch system 500 is moved out of the slot by operating the rotating member 2238.

According to the above embodiments, it is known that the portable optical touch system of the present invention may replace the current user input interfaces such as a mouse, a keyboard, a touchpad and etc. And the portable optical touch system of the present invention is compact, easy for carry, disposable at will and low cost. In addition, the portable optical touch system of the present invention will not be limited to a smooth working surface as the conventional mouse, and will not be limited by requiring a physical touch region as the resistive or capacitive touch panel. According to the above embodiments, it is also known that the portable optical touch system of the present invention may be integrated with or communicate with an electronic device having a display screen, is able to control the motion of a cursor shown on the display screen, and is even able to realize all functions achievable by current commercial touch screens such as single point control, multiple control and etc. It should be mentioned that, the technology using optical detection of an object is also called the optical coupling technology, i.e. optical signals reflected by an object is detected by at least one image sensor, and the optical signals are converted into electric signals, and the correlation of the electric signals obtained by the image sensor will be processed at last so as to obtain the character information of the object.

As mentioned above, the present invention mainly adopts two image sensing modules and a processing circuit to construct a portable optical touch system. In an actual design, the two image sensing modules have partially overlapped field of views and the partially overlapped field of views is for defining a touch region. In this manner, when there is an object (e.g. a finger or a pen-like object) inside the touch region, the processing circuit may calculate a position of the object according to images of the object acquired the two image sensing modules. In a further design, the two image sensing modules may emit IR light or laser light to illuminate the object so as to acquire the images of the object reflecting the IR light or the laser light whereby the processing circuit is able to calculate the position of the object according to these acquired images.

Additionally, the present invention further adopts the auxiliary device, so as to move the portable optical touch system out of the slot (i.e. out of the electronic device) in the using state, and move the portable optical touch system into the slot (i.e. into the electronic device) in the accommodating state. Therefore, a convenience for using and accommodating the portable optical touch system is increased.

In one aspect, the term "coupled" or the like may refer to being directly coupled. In another aspect, the term "coupled" or the like may refer to being indirectly coupled.

Various items may be arranged differently (e.g., arranged in a different combination, or implemented in a different way) all without departing from the scope of the subject technology. In one aspect of the disclosure, the elements recited in the accompanying claims may be performed by one or more modules or sub-modules.

It is understood that the specific combination disclosed is an illustration of exemplary approaches. Based upon design preferences, it is understood that any combination of the modules or elements aforementioned may be rearranged.

The disclosure is provided to enable any person skilled in the art to practice the various aspects described herein. The disclosure provides various examples of the subject technology, and the subject technology is not limited to these examples.

Various modifications to these aspects will be readily apparent to those skilled in the art, and the generic principles defined herein may be applied to other aspects.

Although the invention has been explained in relation to its preferred embodiment, it is not used to limit the invention. It is to be understood that many other possible modifications and variations can be made by those skilled in the art without departing from the spirit and scope of the invention as hereinafter claimed.

What is claimed is:

1. An electronic apparatus, comprising:
    an electronic device having a slot; and
    a portable optical touch system disposed in the slot, wherein the portable optical touch system comprises:
        a first image sensing module;
        a second image sensing module, wherein a field of view of the first image sensing module and a field of view of the second image sensing module are partially overlapped and the partially overlapped field of views is for defining a touch region;
        a length-adjustable connecting device connecting to the first image sensing module and the second image sensing module, wherein the length-adjustable connecting device adjusts a distance between the first image sensing module and the second image sensing module;
        a communication interface; and
        a processing circuit for calculating a position of an object in the touch region according to images of the object acquired by the first image sensing module and the second image sensing module, and for outputting information of the position through the communication interface.

2. The portable optical touch system as claimed in claim 1, wherein the first image sensing module comprises a first housing and a first image sensor, and the second image sensing module comprises a second housing and a second image sensor; the first image sensor and the second image sensor are respectively disposed in the first housing and the second housing, and are electrically coupled to the processing circuit; the first housing and the second housing are configured to connect the connecting device and respectively comprise a first transparent part and a second transparent part such that the first image sensor and the second image sensor respectively acquire images through the first transparent part and the second transparent part; and the first image sensor and the second image sensor have the partially overlapped field of views.

3. The portable optical touch system as claimed in claim 2, wherein there is a first predetermined included angle between an image sensing surface of the first image sensor and a bottom surface of the first housing, and there is a second predetermined included angle between an image sensing surface of the second image sensor and a bottom surface of the second housing; and the first and second predetermined included angles are substantially 90 degrees.

4. The portable optical touch system as claimed in claim 1, wherein the touch region is a shape of quadrilateral which has a first side, a second side, a third side and a fourth side sequentially connected to each other; the first image sensing module is disposed at a corner between the first side and the fourth side, and the second image sensing module is disposed at a corner between the first side and the second side; and the second side and the fourth side have predetermined lengths.

5. The portable optical touch system as claimed in claim 2, wherein there is a first predetermined included angle between an image sensing surface of the first image sensor and a bottom surface of the first housing, and there is a second predetermined included angle between an image sensing surface of the second image sensor and a bottom surface of the second housing; and the first and second predetermined included angles are smaller or larger than 90 degrees.

6. The portable optical touch system as claimed in claim 1, wherein the touch region is a shape of quadrilateral which has a first side, a second side, a third side and a fourth side sequentially connected to each other; the first image sensing module is disposed at a corner between the first side and the fourth side, and the second image sensing module is disposed at a corner between the first side and the second side; and lengths of the second side and the fourth side are defined respectively according to farthest field of views detectable by the first image sensing module and the second image sensing module.

7. The portable optical touch system as claimed in claim 2, wherein the first housing comprises a first body and a second body; the communication interface is coupled to the first body while the first image sensor and the first transparent part are disposed in the second body; and the second body is configured to connect the connecting device and is rotatable relative to the first body.

8. The portable optical touch system as claimed in claim 2, wherein the each image sensing module further comprises an IR emitter and an IR filter allowing only IR light to pass through; the IR emitter is configured to emit the IR light to illuminate the object; and the each image sensor acquires the images of the object through the associated IR filter.

9. The portable optical touch system as claimed in claim 2, wherein the each image sensing module further comprises an IR filter allowing only IR light to pass through; the portable optical touch system further comprises at least one IR emitter; the at least one IR emitter is configured to emit the IR light to illuminate the object; and the each image sensor acquires the images of the object through the associated IR filter.

10. The portable optical touch system as claimed in claim 2, wherein the each image sensing module further comprises an IR emitter and an optical lens set; the IR emitter is configured to emit IR light to illuminate the object; at least one optical lens in the optical lens set is alternatively coated with a plurality of MgO layers and a plurality of $TiO_2$ or $SiO_2$ layers; and the each image sensor acquires the images of the object through the associated optical lens set.

11. The portable optical touch system as claimed in claim 10, wherein the each optical lens set is configured to broaden the field of view of the associated image sensor to at least 90 degrees.

12. The portable optical touch system as claimed in claim 2, wherein the each image sensing module further comprises a laser emitting device and an optical lens; the laser emitting device is configured to emit a point laser light to be converted to a linear laser light by the optical lens to illuminate the object in the touch region; and the each image sensor is configured to acquire the images of the object.

13. The portable optical touch system as claimed in claim 2, further comprising at least one laser emitting device and at least one optical lens; the laser emitting device is configured to emit a point laser light to be converted to a linear laser light by the optical lens to illuminate the object in the touch region; and the image sensors are configured to acquire the images of the object.

14. The portable optical touch system as claimed in claim 1, wherein the communication interface is a wired communication interface or a wireless communication interface.

15. The portable optical touch system as claimed in claim 1, wherein the processing circuit further defines a function pattern in the touch region to be used as a virtual user input device, wherein the virtual user input device has functions of a mouse, a keyboard, a touchpad or a switch.

16. The portable optical touch system as claimed in claim 1, wherein the communication interface outputs the information of the position of the object to an electronic device comprising a display screen, and the processing circuit communicates with the electronic device through the communication interface to correlate the position of the object in the touch region with a position shown on the display screen.

17. The portable optical touch system as claimed in claim 1, further comprising a light projector configured to project a function pattern on an actual working surface corresponding to the touch region such that the processing circuit further defines the function pattern in the touch region to be used as a virtual user input device, and the virtual user input device has functions of a mouse, a keyboard, a touchpad or a switch.

18. The portable optical touch system as claimed in claim 1, wherein the processing circuit calculates the position of the object by using triangulation or intersection of two lines.

19. The portable optical touch system as claimed in claim 1, wherein the electronic device further comprises an auxiliary device having a using state and an accommodating state, wherein the auxiliary device is accommodated inside the slot.

20. The electronic apparatus as claimed in claim 19, wherein the auxiliary device further comprises: a sliding rail located inside the slot, for accommodating the auxiliary device and the portable optical touch system, wherein the auxiliary device moves the portable optical touch system out of the exterior of the slot or into the interior of the slot along the sliding rail; and a snap member snapping the auxiliary device when the auxiliary device moves the portable optical touch system into the interior of the slot.

21. The electronic apparatus as claimed in claim 20, wherein the auxiliary device further comprises:
a flexible member disposed in the sliding rail and driving the auxiliary device to move the portable optical touch system out of the exterior of the slot.

22. The electronic apparatus as claimed in claim 20, wherein the auxiliary device further comprises: a driving member disposed outside the electronic device and connecting the snap member to drive the snap member so as to separate the snap member separates from the auxiliary device.

23. The electronic apparatus as claimed in claim 20, wherein the electronic device further comprises:
a limiting component disposed on two opposite sides of the sliding rail for limiting a moving location of the auxiliary device.

24. The electronic apparatus as claimed in claim 19, wherein the portable optical touch system is pivoted on the auxiliary device.

25. The electronic apparatus as claimed in claim 19, wherein the length-adjustable connecting device comprises:
a first positioning member having a protrusion; and
a second positioning member having a plurality of recessions arranged in sequence, and the recessions are respectively corresponded the protrusion;
wherein, when the length-adjustable connecting device is moved, the protrusion is engaged with one of the recessions, so as to adjust the distance between the first image sensing module and the second image sensing module.

26. The electronic apparatus as claimed in claim 25, wherein the first positioning member is a flexible.

27. The electronic apparatus as claimed in claim 19, wherein the auxiliary device comprises:
a lock member locking the auxiliary device on the electronic device; and
a rotating member connecting the lock member and the portable optical touch system.

28. The electronic apparatus as claimed in claim 27, wherein the rotating member comprises:
a third positioning member disposed on the lock member and having a protrusion; and
a fourth positioning member having a plurality of recessions arranged in sequence, and the recessions of the fourth positioning member are respectively corresponded the protrusion of the third positioning member;
wherein, when the portable optical touch system is rotated by the rotating member, the protrusion of the third positioning member is engaged with one of the recessions of the fourth positioning member, so as to adjust the rotating angle of the portable optical touch system.

29. The electronic apparatus as claimed in claim 28, wherein the third positioning member is a flexible.

30. The electronic apparatus as claimed in claim 19, wherein the electronic device comprises:
a driving member disposed outside the electronic device and adjacent to the portable optical touch system, for driving the portable optical touch system such that a portion of portable optical touch system moves out of the slot.

* * * * *